(12) United States Patent
Chung et al.

(10) Patent No.: US 10,147,295 B2
(45) Date of Patent: *Dec. 4, 2018

(54) PERSONNEL TRACKING AND MONITORING SYSTEM AND METHOD EMPLOYING PROTECTIVE GEAR INCLUDING A PERSONNEL ELECTRONIC MONITOR DEVICE

(71) Applicant: AVANTE INTERNATIONAL TECHNOLOGY, INC., Princeton Junction, NJ (US)

(72) Inventors: Kevin Kwong-Tai Chung, Princeton, NJ (US); Albert Han-Ping Chung, Princeton, NJ (US); Yulin Huang, East Windsor, NJ (US); Michael Dilalo, Princeton Junction, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,496

(22) Filed: Jun. 5, 2018

(65) Prior Publication Data

US 2018/0293866 A1 Oct. 11, 2018

Related U.S. Application Data

(63) Continuation of application No. 15/343,399, filed on Nov. 4, 2016, now Pat. No. 10,019,881.

(Continued)

(51) Int. Cl.
*G08B 21/04* (2006.01)
*G08B 21/02* (2006.01)
(Continued)

(52) U.S. Cl.
CPC ... *G08B 21/0415* (2013.01); *G08B 13/19621* (2013.01); *G08B 21/02* (2013.01);
(Continued)

(58) Field of Classification Search
None
See application file for complete search history.

(56) References Cited

U.S. PATENT DOCUMENTS 5,697,099 A 12/1997 Siska et al.
6,657,543 B1 12/2003 Chung
(Continued)

FOREIGN PATENT DOCUMENTS

WO 2008/085511 7/2008
WO 2011/057306 5/2011

OTHER PUBLICATIONS

International Searching Authority/US, "International Search Report and Written Opinion" International Application No. PCT/US2015/055761, dated Jan. 8, 2016, 15 pages.
(Continued)

*Primary Examiner* — Laura Nguyen
(74) *Attorney, Agent, or Firm* — Clement A. Berard, Esq.; Dann, Dorfman, Herrell & Skillman, PC

(57) ABSTRACT

A personnel tracking and monitoring system and method comprises sets of monitoring devices each including: an electronic device having a unique identifier, a locating device, and a wireless communication device communicating via a plurality of protocols. The unique identifier, the location data and time data are associated and are transmitted wirelessly to one or more monitoring stations which store same in a database. The electronic devices and/or one or more relay devices may be configured before arrival at the site and/or while en route. Data stored in the data base is compared with predetermined criteria and if any predeter-
(Continued)

mined criteria is exceeded, an indication thereof is communicated to the monitoring stations and/or to the electronic device to which such indication relates.

24 Claims, 10 Drawing Sheets

Related U.S. Application Data

(60) Provisional application No. 62/282,622, filed on Nov. 4, 2015.

(51) Int. Cl.

| | |
|---|---|
| G08B 13/196 | (2006.01) |
| H04W 4/80 | (2018.01) |
| H04W 4/90 | (2018.01) |
| H04W 64/00 | (2009.01) |
| G08B 25/10 | (2006.01) |
| G08B 25/01 | (2006.01) |
| H04B 7/14 | (2006.01) |

(52) U.S. Cl.
 CPC ............ *G08B 25/016* (2013.01); *G08B 25/10* (2013.01); *H04B 7/14* (2013.01); *H04W 4/80* (2018.02); *H04W 4/90* (2018.02); *H04W 64/00* (2013.01)

(56) References Cited

U.S. PATENT DOCUMENTS

| | | |
|---|---|---|
| 6,696,954 B2 | 2/2004 | Chung |
| 6,703,935 B1 | 3/2004 | Chung et al. |
| 6,883,710 B2 | 4/2005 | Chung |
| 6,943,688 B2 | 9/2005 | Chung et al. |
| 6,961,000 B2 | 11/2005 | Chung |
| 7,036,729 B2 | 5/2006 | Chung |
| 7,077,313 B2 | 7/2006 | Chung et al. |
| 7,098,793 B2 | 8/2006 | Chung |
| 7,158,030 B2 | 1/2007 | Chung |
| 7,197,167 B2 | 3/2007 | Chung et al. |
| 7,221,269 B2 | 5/2007 | Onderko et al. |
| 7,319,397 B2 | 1/2008 | Chung et al. |
| 7,342,497 B2 | 3/2008 | Chung et al. |
| 7,382,255 B2 | 6/2008 | Chung |
| 7,423,535 B2 | 9/2008 | Chung et al. |
| 7,436,789 B2 | 10/2008 | Caliskan et al. |
| 7,456,748 B2 | 11/2008 | Chung et al. |
| 7,501,954 B1 | 3/2009 | Chung |
| 7,508,308 B2 | 3/2009 | Chung |
| 7,513,425 B2 | 4/2009 | Chung |
| 7,561,724 B2 | 7/2009 | Chung et al. |
| 7,592,911 B1 | 9/2009 | Hudgens et al. |
| 7,614,553 B2 | 11/2009 | Chung et al. |
| 7,623,036 B2 | 11/2009 | Onderko et al. |
| 7,635,087 B1 | 12/2009 | Chung et al. |
| 7,635,088 B2 | 12/2009 | Chung et al. |
| 7,813,934 B1 | 10/2010 | Chung |
| 7,828,215 B2 | 11/2010 | Chung et al. |
| 7,839,289 B2 | 11/2010 | Chung et al. |
| 7,975,920 B2 | 7/2011 | Chung et al. |
| 7,988,047 B2 | 8/2011 | Chung et al. |
| 8,066,184 B2 | 11/2011 | Chung et al. |
| 8,174,383 B1 | 5/2012 | Chung et al. |
| 8,261,985 B2 | 9/2012 | Chung |
| 8,261,986 B2 | 9/2012 | Chung et al. |
| 8,686,861 B2 | 4/2014 | Chung et al. |
| 8,730,388 B2 | 5/2014 | Osborn |
| 9,082,284 B2 | 7/2015 | Prieto |
| 9,131,892 B2 | 9/2015 | Markel |
| 9,286,511 B2 | 3/2016 | Chung et al. |
| 9,434,397 B2 | 9/2016 | Chung et al. |
| 2005/0001720 A1* | 1/2005 | Mason ................ G01C 21/206 340/539.13 |
| 2007/0139191 A1* | 6/2007 | Quatro .................. G06Q 10/08 340/539.13 |
| 2008/0091347 A1 | 4/2008 | Tashiro |
| 2009/0023421 A1 | 1/2009 | Parkulo et al. |
| 2009/0174547 A1* | 7/2009 | Greene .................. A62B 99/00 340/539.13 |
| 2009/0222980 A1* | 9/2009 | Klug .................... A41D 19/001 2/455 |
| 2009/0231423 A1 | 9/2009 | Becker et al. |
| 2012/0210498 A1 | 8/2012 | Mack |
| 2014/0012545 A1* | 1/2014 | Tsongas .............. G06F 17/5004 703/1 |
| 2014/0052405 A1 | 2/2014 | Wackym |
| 2014/0118143 A1* | 5/2014 | Monacos .............. G08B 25/016 340/539.13 |
| 2014/0321329 A1* | 10/2014 | Pulleti ................... H04W 16/18 370/256 |
| 2014/0375459 A1 | 12/2014 | Curtis |
| 2015/0046140 A1* | 2/2015 | Kamalakannan ..... G06F 17/509 703/13 |
| 2015/0371136 A1* | 12/2015 | Goossen ................ G06Q 10/06 706/46 |
| 2016/0106174 A1 | 4/2016 | Chung et al. |
| 2016/0188969 A1 | 6/2016 | Chung et al. |

OTHER PUBLICATIONS

Oliver J. Woodman, "Pedestrian localisation for indoor environments", Sep. 9, 2010, 225 pages.
United States Patent & Trademark Office, "Office Action", U.S. Appl. No. 14/884,375, dated Jan. 12, 2017, 17 pages.

\* cited by examiner

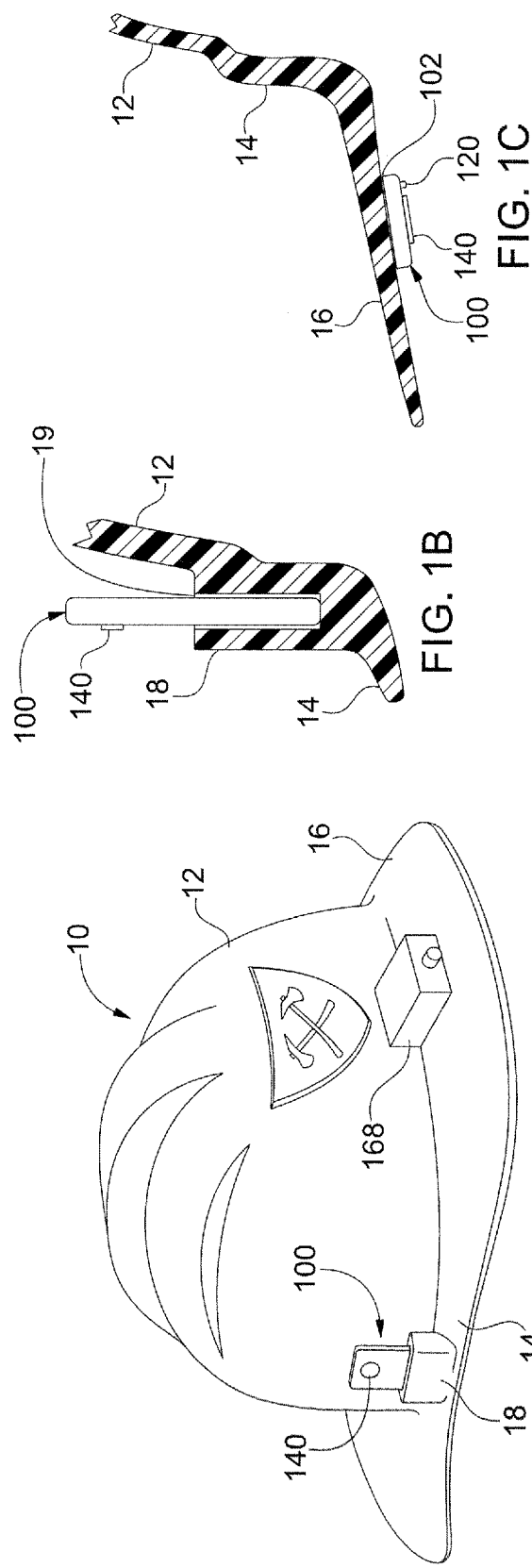
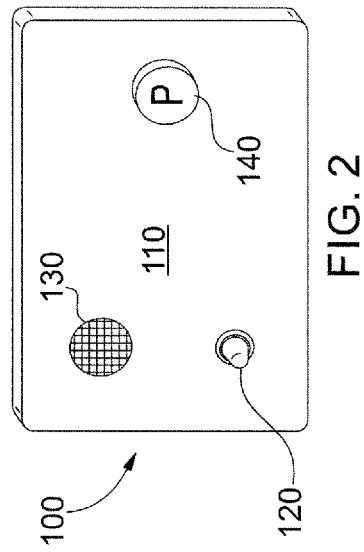

PERSONNEL TRACKING AND MONITORING SYSTEM AND METHOD EMPLOYING PROTECTIVE GEAR INCLUDING A PERSONNEL ELECTRONIC MONITOR DEVICE

This Application is a continuation of U.S. patent application Ser. No. 15/343,399 filed Nov. 4, 2016, entitled "PERSONNEL TRACKING AND MONITORING SYSTEM AND METHOD EMPLOYING PROTECTIVE GEAR INCLUDING A PERSONNEL ELECTRONIC MONITOR DEVICE" which claims the benefit of U.S. Provisional Application No. 62/285,622 filed Nov. 4, 2015, entitled "Real Time Locating and Sensor Based Personnel Safety Monitoring and Reporting System for Fireman and First Responder to Hazardous Environment with Installed and Ad Hoc Zonal Defined Location Management," each of which is hereby incorporated herein by reference in its entirety.

The present invention relates to a tracking and monitoring system and method, and, in particular, to such system and method including a personnel electronic monitor device (PEMD).

The following US Patents and Patent Publications relate to tracking systems and methods, are identified as background information, and are hereby incorporated herein by reference in their entireties:

U.S. Pat. No. 9,434,397 entitled "Positive Train Control System and Apparatus Therefor."
U.S. Pat. No. 8,174,383 entitled "System and Method for Operating a Synchronized Digital Network."
U.S. Pat. No. 7,839,289 entitled "Object Monitoring, Locating, and Tracking System and Method Employing RFID Devices."
U.S. Pat. No. 7,813,934 entitled "Tracking Apparatus, as for an Exhibition."
U.S. Pat. No. 7,623,036 entitled "Adjusting Data Tag Readers With Feed-Forward Data."
U.S. Pat. No. 7,561,724 entitled "Registration Method, as for Voting."
U.S. Pat. No. 7,513,425 entitled "Article Tracking System and Method."
U.S. Pat. No. 7,508,308 entitled "Tracking Apparatus and Method, As For An Exhibition."
U.S. Pat. No. 7,501,954 entitled "Dual Circuit RF Identification Tags."
U.S. Pat. No. 7,456,748 entitled "RFID Antenna With Pre-Applied Adhesives."
U.S. Pat. No. 7,423,535 entitled "Object Monitoring, Locating, and Tracking Method Employing RFID Devices."
U.S. Pat. No. 7,382,255 entitled "Medical Assistance and Tracking Method Employing Smart Tags."
U.S. Pat. No. 7,342,497 entitled "Object Monitoring, Locating, and Tracking System Employing RFID Devices."
U.S. Pat. No. 7,319,397 entitled "RFID Device for Object Monitoring, Locating, and Tracking."
U.S. Pat. No. 7,221,269 entitled "Self-Adjusting Portals With Movable Data Tag Readers For Improved Reading of Data Tags."
U.S. Pat. No. 7,197,167 entitled "Registration Apparatus and Method, as for Voting."
U.S. Pat. No. 7,158,030 entitled "Medical Assistance and Tracking System And Method Employing Smart Tags."
U.S. Pat. No. 7,098,793 entitled "Tracking System and Method Employing Plural Smart Tags."
U.S. Pat. No. 7,036,729 entitled "Article Tracking Method and System."
U.S. Pat. No. 6,961,000 entitled "Smart Tag Data Encoding Method."
U.S. Pat. No. 6,943,688 entitled "Antenna Arrangement For RFID Smart Tags."
U.S. Pat. No. 6,883,710 entitled "Article Tracking System and Method."
U.S. Pat. No. 6,703,935 entitled "Antenna Arrangement For RFID Smart Tags."
U.S. Pat. No. 6,696,954 entitled "Antenna Array For RFID Smart Tags."
U.S. Pat. No. 6,657,543 entitled "Tracking Method and System, As For An Exhibition."
U.S. Patent Publication 2016/0106174 entitled "Protective Headgear Including a Personnel Electronic Monitor Device."

Firefighters and other first responders must enter dangerous and rapidly changing environments where they could become lost or injured, or trapped. These environments often contain dangerous conditions such as fire, heat, poisonous gases, and the like. It is important that the status and condition of personnel in such environments be known and that they can be located by colleagues and/or rescuers if necessary. Conventional communications are unreliable in such environments and conventional monitors, such as a man-down beepers, simply provide an audible and/or visible indication of location to those who may be within hearing range and/or line of sight of the down person within the often noisy and/or reduced vision environment. Moreover, the structure itself can impede communication and/or introduce error into GPS and like locating arrangements. In such environments it is desirable to know the location of personnel, as well as the status of such personnel, substantially in real time, at least at a basic level of whether the person is animated, as opposed to still. It is also desirable to communicate with personnel in such environments as well as to provide an alert or warning or other notification to such personnel.

Many industrial sites and resource extraction sites, e.g., oil and gas drilling and/or fracking sites, off-shore drilling rigs, mines, chemical processing facilities, refineries, steel and other mills, employ or process various chemicals, gases, and other materials, and/or equipment, that are dangerous or hazardous to personnel and/or to equipment and/or to the environment. Equipment abnormalities, failures and accidents can and do happen, and can suddenly and unexpectedly release such dangerous and/or hazardous substances. In such locations it is desirable to know the location of personnel substantially in real time, as well as the status of such personnel at least at a basic level of whether the person is animated, as opposed to still. It is also desirable to provide an alert or warning or other notification to such personnel.

A conventional way of doing so often involves a personnel badge, e.g., an RFID tag, that responds to interrogation to identify the presence of personnel and for allowing the location of personnel to be determined, e.g., by triangulation, ranging or other method, at least to a moderate degree of accuracy. Personnel often supplement their personal RFID badges with a two-way radio for communication with other workers and local management, and/or may carry a cell or smart phone for communicating with local and/or remote management. However, carrying plural devices can be cumbersome and/or inconvenient.

Radio communication, e.g., two-way radios, often comes with the disadvantage that communications go to all personnel within range irrespective of whether or not the communication is relevant to those personnel, which can distract personnel from their task at hand and/or reduce efficiency. Cell and smart phones, on the other hand, provide one-to-one communication and so are not convenient for providing a warning or alert to all personnel in an area should a condition dangerous or hazardous suddenly arise.

In addition, locating schemes employing triangulation and/or ranging can be rendered inaccurate, unreliable and/or inoperative where there is a high level of electrical noise and/or interference, as is understood to be common at sites experiencing conducting fracking and other operations or in industrial and other environments which involve high power electrical pumps and motors that generate such noise and interference.

Applicant believes there may be a need for protective system and method that can monitor and report substantially in real time its location and the status of the persons wearing the personal monitors and that can provide an alert or warning or other message for such person.

Accordingly, a personnel tracking and monitoring system may comprise sets of monitoring devices each including: an electronic device having a unique identifier, a locating device, wireless communication via a plurality of protocols, and a user interface; an imaging device and a biologic monitor device communicating image and biologic data to the electronic device. The unique identifier, the location data and time data are associated with image data and with biologic data and are transmitted wirelessly via portable relay devices to one or more monitoring stations which store same in a database. Data stored in the data base is compared with predetermined criteria and if any predetermined criteria is exceeded, an indication thereof is communicated to the monitoring stations and/or to the electronic device to which such indication relates.

Further, a method for tracking and monitoring personnel may comprise:
  providing sets of monitoring devices each set including: an electronic device having a unique identifier, a locating device, wireless communication via a plurality of protocols, and a user interface; an imaging device and a biologic monitor device communicating image and biologic data to the electronic device.
  associating the unique identifier, the location data and time data with image data and biologic data;
  transmitting the image data and biologic data and the unique identifier, the location data and the time data associated therewith;
  deploying a plurality of portable relay devices each configured to communicate wirelessly with the monitoring devices;
  relaying the image data and biologic data and the unique identifier, the location data and the time data associated therewith to one or more monitoring stations;
  receiving the relayed data,
  storing the received data in a database;
  comparing data stored in the data base with predetermined criteria and when a predetermined criteria is exceeded,
  generating and communicating an indication thereof to each monitoring station and/or to the electronic device to which such indication relates.

Still further, a personnel tracking and monitoring system may comprise: a plurality of sets of monitoring devices including: an electronic device having a unique identifier, a locating device, a wireless communication device, and a user interface; wherein the unique identifier, location data and time data are associated and are communicated; a plurality of portable relay devices deployable at a site and to communicate with the monitoring devices to relay the unique identifier, location data and time data associated therewith, and information to and/or from the user interface, to one or more monitoring stations either directly or indirectly; wherein deployment of the portable relay devices at the site is based upon received site records, and the portable relay devices are configured and deployed at the site in accordance with a deployment plan, whereby location at the site can be defined with respect to each deployed portable relay device without reference to an external locating signal; and a monitoring station communicates with the electronic devices directly and/or indirectly via the portable relay devices, the monitoring station including a database for storing the unique identifier, location data and time data, and information from the user interface, the monitoring station compares data stored in the data base with one or more predetermined criteria and when one or more of the predetermined criteria is exceeded, generates an indication thereof and communicates the indication at least to the electronic device to which such indication relates.

In addition, a method for tracking and monitoring personnel may comprise: providing a plurality of sets of monitoring devices each including: an electronic device having a unique identifier and including a locating devices, a wireless communication device, and a user interface to provide information to and from a user; associating the unique identifier, the location data and time data; deploying a plurality of portable relay devices each having a wireless communication device to communicate with the monitoring devices; receiving records describing the site; planning deployment of the portable relay devices at specific locations; configuring the portable relay devices including defining for each the specific location at which it is to be deployed; and deploying the portable relay devices, whereby the portable relay device is deployed substantially at the specific location so that location can be defined without reference to an external locating signal; relaying the unique identifier, the location data and the time data to one or more monitoring stations; communicating to receive and store the received unique identifier, the location data and the time data in a database; comparing data stored in the data base with one or more predetermined criteria and when one or more of the predetermined criteria is exceeded, generating and communicating an indication to each monitoring station and/or to the electronic device 100 to which such indication relates.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIG. 1A is a perspective view of an example embodiment of a protective headgear, and FIGS. 1B, 1C and 1D are partial cross-sectional views of an example embodiment of protective headgear of FIG. 1 illustrating examples of mounting the example personnel electronic monitor device thereon;

FIG. 2 is a perspective view of the example personnel electronic monitor device of FIG. 1;

Figure 1:
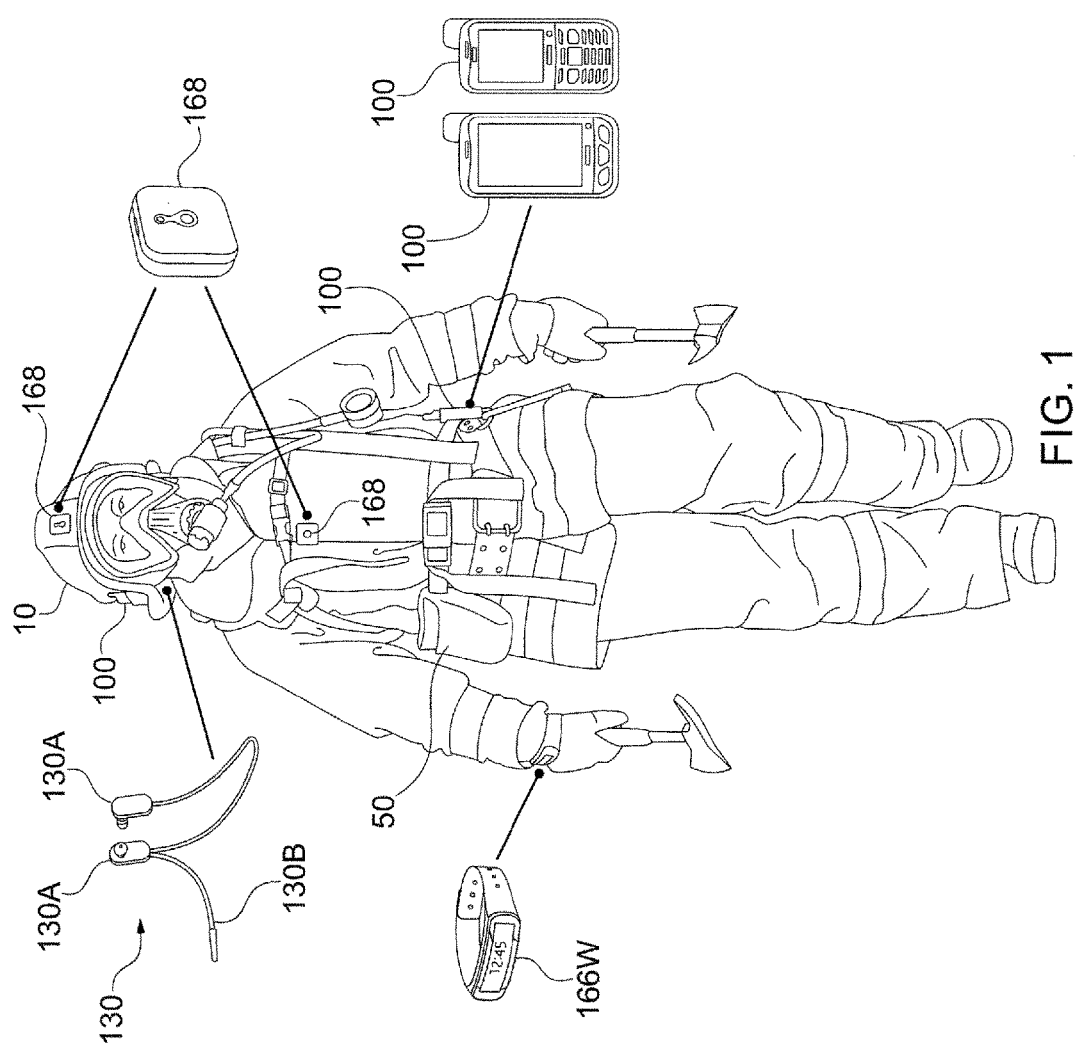
FIG. 1 is a view of a firefighter wearing protective gear including an example embodiment of a personnel electronic monitor device and other elements of the system and method herein.

In the Drawing, where an element or feature is shown in more than one drawing figure, the same alphanumeric designation may be used to designate such element or feature in each figure, and where a closely related or modified element is shown in a figure, the same alphanumerical designation may be primed or designated "a" or "b" or the like to designate the modified element or feature. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

FIG. 1 view of a firefighter wearing protective gear including an example embodiment of a personnel electronic monitor device 100 and other elements of the system and method herein, FIG. 1A is a perspective view of an example embodiment of a protective headgear 10, and FIGS. 1B, 1C and 1D are partial cross-sectional views of the example protective headgear 10 of FIG. 1 illustrating examples of mounting the example personnel electronic monitor device 100 thereon, and FIG. 2 is a perspective view of one example personnel electronic monitor device 100 of FIG. 1. Protective headgear 10 includes a crown 12 having a brim 14 around a portion of the lower edge thereof and a peak 16 extending from the front and/or rear lower edge of crown 12, depending upon the intended use, e.g., as a firefighter helmet, a police helmet, a construction helmet, and the like.

Personnel electronic monitor device (PEMD) 100 may be carried at any convenient location on the wearer 30. Examples include being carried on a belt or harness, in a pocket or carrier or holster, strapped to a wrist or arm, mounted to a helmet, or any other suitable location. Carrying PEMD 100 on a belt or other item of equipment where it can easily be grasped for use is generally thought to be preferred.

One example headgear shell 12 has one or more receptacles 18 for receiving various items of use to the wearer of the headgear 10 such as personnel electronic monitor device (PEMD) 100 and/or a video camera 168. Receptacles 18 may be located, e.g., approximately over each ear of a typical wearer and at the rear of headgear 10. Typically, receptacles 18 provide recesses 19 that are open at the top and PEMD 100 and/or an imaging device 168, e.g., a video camera 168, may be inserted therein in a downward direction and may be retained therein by friction and/or gravity. Alternatively, PEMD 100 and/or a video camera 168 may be supported or attached under the peak 16 of headgear shell 12 and may be supported thereon by any suitable fastening arrangement, e.g., hook and loop fasteners such as VELCRO® material, adhesive, snap-in clips, screws, pins and the like.

In another alternative, PEMD 100 and/or a video camera 168 may be molded into headgear shell 12 or installed in a recess provided therein at a convenient location thereon, e.g., in crown 12 or in peak 16. In such instance, PEMD 100 and/or a video camera 168 may be formed or made in such as way as to be sufficiently flexible so that it can be conformed to the shape of the receiving location or recess of headgear shell 12, or may be made in a shape that conforms to the shape of the receiving location or recess. Imager 168 may be aimed in a forward direction relative to the personnel's body and/or plural imagers aimed in different directions may be employed, e.g., so as to obtain 180° or 270° or 360° images.

In one example embodiment, PEMD 100 has an actuator 140 usable to call for assistance, e.g., a so-called "panic button" 140 or "Help On Demand" actuator 140, which is configured to be easily reachable while headgear 10 is being worn. Thus, when PEMD 100 is placed in an external receptacle 18, panic button 140 should face outward rather than inward where it would be difficult to reach because crown 12 would be in the way.

Typically, headgear shell 12 is stamped metal, e.g., aluminum or steel, or is molded of a tough durable strong plastic or composite material, typically one filled with fiberglass or other reinforcing material. Receptacles 18 are typically molded integrally with headgear shell 12, e.g., on the brim 14, 16 thereof, but may be attached by adhesive and/or another fastener. Where PEMD 100 is molded into headgear shell 12, an opening is provided therein to the exterior of headgear shell 12 for "panic button" 140 so that panic button 140 can be actuated from outside of headgear 10 when headgear 10 is being worn, e.g., on a head.

One example embodiment of PEMD 100 is in a generally rectangular enclosure or housing or case 110 that has as an example on one broad face a visual transducer 120, e.g., a light emitting diode (LED) 120, for providing a visual notification and/or an imaging device for capturing images, an audio (sound) transducer 130, e.g., a loudspeaker, buzzer, beeper, piezoelectric device, microphone, or other sound producing and/or receiving device 130, for providing an audible notification and/or receiving an audio input, and a "Help on Demand" or Panic Button" actuator 140 for initiating a communication requesting assistance when actuated, e.g., depressed.

Imaging device 168 may be a still imaging device and/or a video imaging device 168 which communicates wirelessly with PEMD 100, e.g., via Bluetooth or via another wireless protocol. Similarly, a visual display 120, e.g., a heads up display projected onto a faceplate of headgear 10, a sound reproducing device 130 and/or a sound receiving device 130, may be provided inside of headgear 10, such as by wireless headphones or buds 130A and/or wireless microphone 130B, which communicate wirelessly with PEMD 100, e.g., via Bluetooth or via another wireless protocol.

A biologic monitor device 166W, e.g., a wrist band or other bio-status device 166W, may be worn by the using personnel, e.g., on a wrist over or under his outer clothing, to sense certain physical and/or biological parameters of the person and communicate such data wirelessly to PEMD 100.

Where personnel are to deploy portable WiFi ad hoc network nodes or similar devices, those devices may be carried in a pouch 50 or other container 50 that is carried or worn by personnel, e.g., attached to a belt or elsewhere on their person or equipment.

When PEMD 100 employs transducers 120, 130, 168 that can provide audible and/or visible notifications and/or receive visual and/or audible inputs, it provides PEMD 100 with the capability of two-way communication in substantially real time, e.g., of images and/or voice communication, which can substantially improve safety by enabling coordination between personnel in the field and monitoring and/or management personnel located elsewhere, e.g., in a monitoring station or other facility remote from the personnel using PEMD 100.

Figure 3:
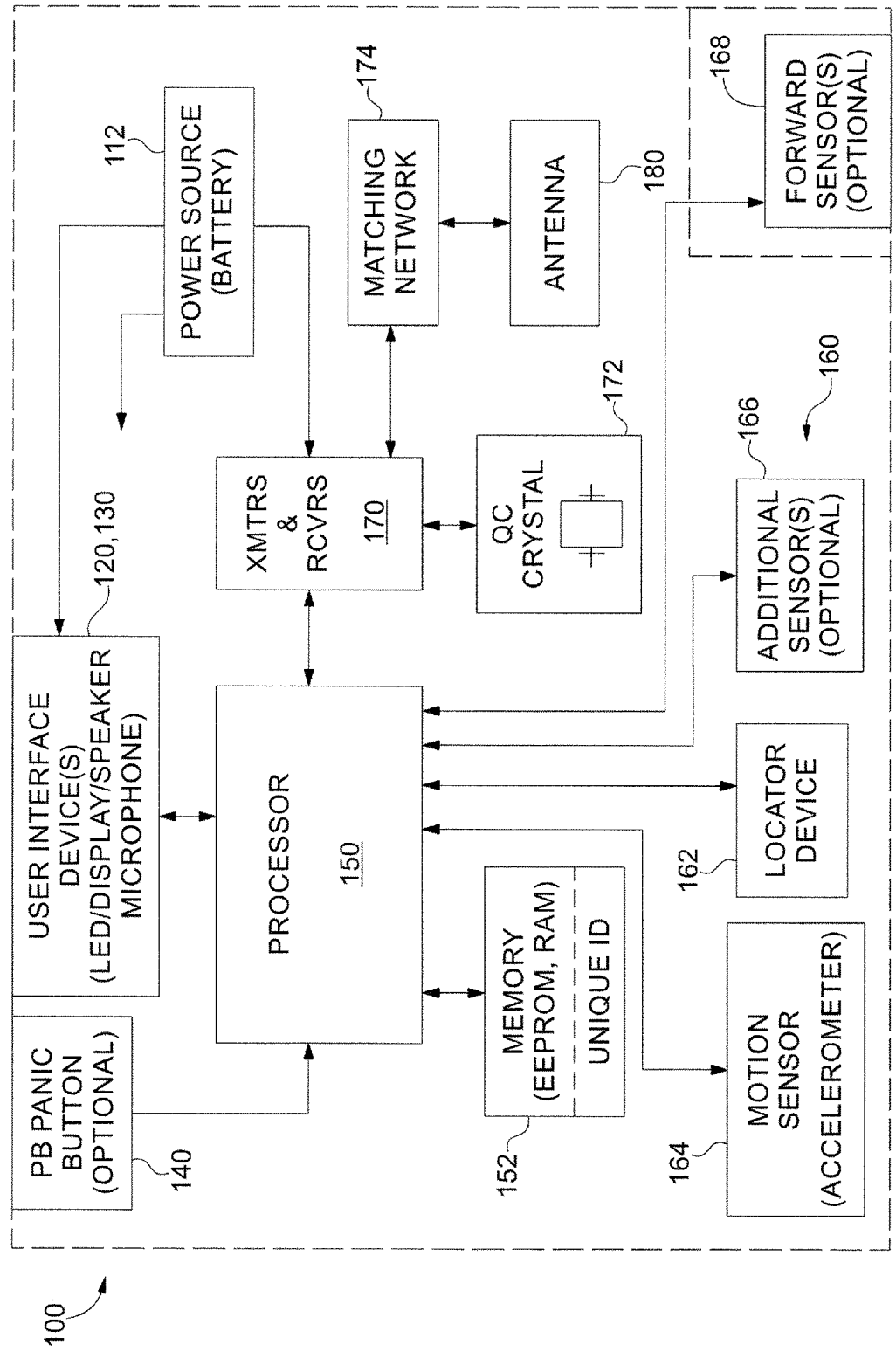
FIG. 3 is a schematic block diagram of an example embodiment of the example personnel electronic monitor device of FIG. 2.

FIG. 3 is a schematic block diagram of an example embodiment of the example personnel electronic monitor device (PEMD) 100 of FIG. 2. Personnel electronic monitor device (PEMD) 100 includes a housing or case 110 which contains the various functional elements thereof. At the surface of housing 110 is a user interface 120, 130 that provides and receives audio and visual indications to and from a wearer of protective gear 10 including PEMD 100. User interface 120, 130 includes visual transducer 120 and audio or sound transducer 130, thereby being configured to provide information to a user in human perceivable form and to receive information from a user.

Data is preferably related to other data using a unique identifier of one kind or another, and any suitable unique identifier may be utilized with the present arrangement. For example, each PEMD 100 may have a unique identifier stored therein that is associated with each transmission made by PEMD 100 so as to become associated with data generated by PEMD 100 and to remain associated with that data when that data is stored in PEMD 100 as well as in a relational database that receives such data. Such unique identifier is typically assigned and permanently stored in each electronic device as part of its manufacturing and/or set up, and is not changeable thereafter (except possibly by extraordinarily separate steps not capable of being performed by a user or service personnel). The unique identifier may be and/or include geo-tagging and/or date-time stamping of data as the data is generated. A unique identifier may be defined by the process of configuring the electronic device, e.g., during a setting up process or by a downloaded application (e.g., by an "app" in everyday parlance).

Visual transducer 120 is coupled to processor 150 for receiving signals representing visual indications and/or notifications, e.g., instructions, alerts and warnings, to be provided to a wearer of protective headgear 10, and preferably also for communicating signals representing video images to processor 150. Visual transducer 120 may include a light, LED, LCD display, a flashing light, a light producing different colors, a heads up display, or other visually perceptible device that may be used to provide a notification, and different visual devices may be utilized to provide different kinds of notifications, e.g., messages, alerts and warnings. For example, a flashing amber light may be used to communicate an alert and a flashing red light a warning; a display screen and/or heads up display may be used to communicate what the alert or warning is and what action should be taken. Visual transducer 120 may be utilized independently of or in conjunction with any other user interface device. Visual transducer 120 may also include an imaging device to capture images, e.g., still and/or video images, for transmission to a monitoring station, thereby to enable monitors and/or managers at a remote location to "see" what field personnel are seeing.

Audio or sound transducer 130 is coupled to processor 150 for receiving signals representing audio indications and/or notifications, respectively, e.g., instructions, alerts and warnings, to be provided to a wearer of protective headgear 10, and for communicating signals representing images and/or video images to processor 150. Processor 150 in turn couples the audio and/or visual signals to memory 152 to be stored and/or to transmitter 170 to be communicated to a monitoring system. Sound transducer 130 may include a buzzer, beeper, annunciator, loudspeaker, earphone or other audibly perceptible device that may be used to provide a notification, and different audible devices may be utilized to provide different kinds of notifications, e.g., messages, alerts and warnings, and may be provided in headgear 10. For example, an on/off buzz or tone may be used to communicate an alert and a different on/off or continuous buzz or tone a warning; a loudspeaker or earphone may be used to communicate the alert or warning and/or what the alert or warning is and what action should be taken. Audible transducer 130 may be utilized independently of or in conjunction with any other user interface device.

Sound transducer 130 may also include a microphone or other sound pick up device of any kind so that sound at the location of PEMD 100 can be communicated to command center 228, 246, 290, or another monitoring station, e.g., to evaluate a situation where a lack of movement condition has been detected by motion sensor 164 and reported, and/or so that two way voice communication between a wearer of headgear 10 and command center 228, 246, and/or 290 can be established, and so that two-way voice communication may be provided when necessary between personnel, e.g., to coordinate actions. Sound transducers 130 may be provided in headgear 10.

Help on Demand or panic button actuator 140, which may be optional, is coupled to processor 150 for signaling, when actuated, that a call for help or assistance is to be initiated, and processor 150 couples that signal to transmitter 170 to be communicated to a monitoring system.

Sensor elements 160 include at least two sensors—a locator device 162 and a motion sensor 164. A locator device 162, e.g., a global positioning system receiver, preferably determines the location of PEMD 100 and protective headgear 10 from precise and reliable signals provided by an external source such as a satellite navigation system. Suitable and available location determining satellite systems include, e.g., the US Global Positioning System (GPS), the Russian GLONASS system, the European Galileo system, the Indian IRNSS system and/or the Chinese BDS system. A preferred locator device 162 utilizes the US GPS system with Wide Area Augmentation System (WAAS) which augments GPS to improve its locating accuracy to within about three meters (conservatively), and typically to within one meter horizontally and 1.5 meters vertically, where it is available, e.g., primarily in the continental United States, Alaska and Canada. The terms "global positioning system"

and "GPS" are used herein to refer generically to any system for determining location from signals transmitted from a remote source, e.g., from an earth orbiting satellite, unless specifically stated otherwise, e.g., as in the "US GPS" system.

While two or more different and independent global positioning system receivers could be employed so that geographic location data is available even when one GPS system is out of range or out of service, the power consumption of locator device 162 may render such duplication impractical at present due to the limited capacity of battery 112. Alternatively, and in some instances preferably, locator device 162 may employ an inertial sensor, e.g., a gyroscopic device or accelerometer, to supplement the GPS locating device so that location data is provided substantially continuously even though signals from the GPS satellites may be obscured, masked, or interrupted.

Further, location data may be obtained by monitoring the strength and/or triangulation of signals transmitted by transmitter-receiver 170, e.g., a received signal strength indication (RSSI) from WiFi and/or Bluetooth and/or other protocol signals, received at PEMD 100 and/or at a relay 250 and/or monitoring station 310, 228, 246, so that location data is provided substantially continuously even though signals from the GPS satellites may be obscured, masked, or interrupted, as may commonly be experienced when inside a structure. The RSSI locating device and trilateration (or triangulation) function may be provided by processor 150 in conjunction with transmitter-receiver 170 and may be considered as part of locator device 162, of motion sensor 164 and/or of any other sensor 160, 166. An example of an RSSI based locating system and method is described in U.S. Pat. No. 7,342,497 entitled "Object Monitoring, Locating, and Tracking System Employing RFID Devices" which is hereby incorporated herein in its entirety by reference.

While locator 162 could use triangulation and/or signal strength and/or propagation delay as a primary way to determine location, these methods, however, may not be preferred as the primary way for locating PEMD 100 due to their susceptibility to radio frequency (RF) interference, signal disruption and error, as well as their sometimes lesser accuracy, but are thought suitable as a secondary way in the absence of or the distortion of GPS signals. While a GPS locator does not require infrastructure at the site, e.g., RF signal and communication relaying devices, to facilitate determining of the location of the PEMDS 100 therein, location determination using WiFi, and/or Bluetooth and/or other protocol signals may operate in response to signals already at known locations at a site or by way of one or more ad hoc network devices that are placed at spaced apart locations at a site, e.g., in a building or other structure, by firefighters and/or other first responders who are there and deploy such ad hoc network devices. Ad hoc networking devices may be placed closer together where a more precise locating accuracy is desired and/or where electrical signal is present, or further apart as circumstances may indicate.

Preferably, certain sites will be mapped in advance to determine the GPS coordinates of various areas, boundaries, restrictions, equipment and other items therein so that the location provided by GPS locator device 162 and/or a network signal based locating protocol can be used to monitor personnel location in relation to such areas and items with suitable accuracy, so that access thereto may be monitored and controlled, and appropriate action may be taken (via a remote monitoring system) if personnel move into an unauthorized or hazardous area, or are not in an appropriate area, or are not in an areas where they are supposed to be in.

Site mapping may be determined and performed on a priority basis, e.g., buildings and structures that have or may have hazardous materials and/or a large number of people present may be mapped on a priority basis, while sites having a lesser potential danger or at risk population may be at a lower priority, if at all. Thus high rise buildings, larger industrial sites and hazardous materials facilities may be mapped as a priority, while small structures, e.g., individual free standing stores and dwelling units may be mapped in advance at a low priority, if at all.

Locating and tracking (which is merely an aggregation of locations over a period of time) will thus facilitate providing personnel who enter into an area that they should not enter to receive a notification to exit such area; and personnel who are not in an area that they should be in to receive a notification to go to such area. Such notification may be based upon predetermined criteria, e.g., an operations plan, and/or by situational circumstances, e.g., presence of intense fire or heat, flammable and/or poisonous gases, and the like.

Motion sensor 164 is typically an accelerometer or pendulum or other device that senses and detects small movements of protective headgear 10 and/or of PEMD 100 as a wearer thereof would make if animated, e.g., in moving, looking around and/or talking and the like, or is substantially motionless. Sensor 164 may be employed for different purposes. When sensor 164 detects such motion, which is an indication that the wearer is animated, e.g., is normal or in good condition, no action is required, however, the motion data may be and preferably is stored in memory 152 which also has the unique identifier of PEMD 100 stored therein and preferably associated with the location data and motion data.

If, however, the wearer is substantially motionless, e.g., asleep, injured, incapacitated, unconscious or otherwise not moving, such condition is likely indicative of a need for assistance whereupon a visual and/or audible notification could be sent to PEMD 100 (via a remote monitoring system) to elicit a response and/or assistance could be dispatched. Thus, motion sensor 164 provides an ongoing indication of the status (health) of the wearer of protective headgear 10 and PEMD 100 that is associated with the unique identifier of PEMD 100 and the protective headgear with which it is associated, and a lack of motion data for more than a predetermined period of time, e.g., more than about five seconds, and preferably between about five seconds and about 30 seconds, is thought to provide a reliable indication that a motionless personnel is likely in need of assistance.

In addition, an accelerometer motion sensor 164 and/or an inertial motion device or both may indicate motion as a function of time that is stored and processed to track the direction and distance a person wearing the device 100 moves, thereby to augment the locating function 162 to include an indication of a present location relative to a previous location, even when there is no suitable GPS signal and/or the network signals used to determine location may be weak and/or subject to interference. With any of the locating devices 162, 164, especially when a personnel is down or trapped, it is better to be able to determine a present location with a lesser accuracy than to have only outdated location information or to lack location information.

Sensor elements 160 may typically, but optionally, include one or more other sensors 166, 166W, e.g., sensors 166, 166W that monitor physical and health-indicating characteristics of personnel, ambient conditions, hazardous substances and/or conditions, the environment, and the like. Examples of sensors 166, 166W include sensors of environmental conditions, temperature, pressure, position, acceleration, impact, distance, gyroscopic and/or inertial information, magnetic field, electrical continuity, altitude, a physical parameter, moisture, humidity, chemicals, gases, medical parameters, biological substances and/or agents, radioactivity, optical, light, infrared, images, still and/or video images, sound, noise, electromagnetic fields, and the like, and any combination of any two or more thereof.

Another sensor 166, 166W can include a wrist band or other bio-status device 166W that is worn by the using personnel, e.g., on a wrist or under his outer clothing, to sense certain physical and biological parameters of the person and communicate such data wirelessly to PEMD 100. Physical and/or biological parameters sensed can include calories expended, steps taken, floors (stair steps) climbed or descended, time and distance, temperature, heart rate, respiration, and the like. Wrist band or other bio-status device 166W preferably communicates with and thorough PEMD 100 via Bluetooth or other wireless communication link so that personnel physical and biological condition can be monitored and/or tracked.

Such sensors may detect the presence and/or absence of what is sensed, or may quantify the level or intensity of what is sensed, or both. Sensor 160 data is associated with the unique identifier of PEMD 100. For example, where PEMD 100 will be used at a site where natural gases may be present, sensors 166 are preferred to include sensors for methane and for hydrogen-sulfide. While it is preferred that such sensors 166 be contained within housing 110, certain sensors require exposure to the environment, e.g., atmosphere, to operate, and so may be so exposed via an opening in housing for that purpose, e.g., a dedicated opening that is configured to have a sensor's sensing element adjacent thereto, or by being mounted externally to housing 110, e.g., on the exterior thereof or on the exterior of headgear shell 12.

In addition, PEMD 100 may optionally include one or more sensors 168 having a field of view outward from where it is worn or mounted, e.g., on headgear 10 or a body, for sensing conditions in a predetermined direction relative thereto, e.g., most commonly in a "forward looking" direction. Sensors 168 may be included in housing 110 of PEMD 100 or may be separately mounted on the personnel, e.g., on the crown or peak 16 of headgear shell 12 or near a person's chest. Optional sensors 168 may include a forward looking radar 168 operating, e.g., on Doppler principles or an ultrasonic or optical (e.g., laser) distance measuring and/or object sensing device 168. Optional sensors 168 also include an imager 168 for capturing still and/or video images (in two or three dimensions) forward of headgear 10 and/or a directional microphone 168 so that monitoring personnel in a remote monitoring station can see and/or hear substantially what the personnel wearing headgear 10 is seeing and/or hearing substantially in real time. Preferably, when sensor 168 includes an imager 168 and/or a microphone 168, processor 150 of PEMD 100 processes the received signals and stores (records) them in memory 152, as well as coupling them to transmitter-receiver 170 for transmission to monitoring station, preferably substantially in real time.

Data from the additional sensors 166, 166W, 168 is also associated with the unique identifier of the PEMD 100 and are transmitted to via a remote monitoring system which in turn returns a notification, e.g., alert or warning, activating one or more of the devices associated with user interface 120, 130 should any data from sensors 166, 166W, 168 indicate a condition deemed to warrant such notification. In cases where the danger or hazard may affect other personnel, areas, the environment and/or equipment, notification may also be sent to PEMDS 100 associated with other personnel, in general or by their location within site 200.

In addition, where any sensor 166, 166W detects a condition that is deemed dangerous or hazardous, e.g., to personnel, the environment, equipment, or otherwise, notification thereof may be provided via user interface 120, 130, alternatively and/or in addition being communicated via transmitter-receiver 170 for providing notification thereof to site management and/or other personnel.

Transmitter-receiver 170 includes one or more transmitters that are coupled to processor 150 for receiving from processor 150 and memory 152 the unique identifier of PEMD 100 and data to be transmitted via matching network 174 and antenna 180 which are contained in housing 110. Transmitter-receiver 170 also includes one or more receivers that are coupled via matching network 174 to antenna 180 for receiving data signals thereat that are coupled to processor 150 to be processed thereby and/or stored in memory 152, and received data may be identified by including in the received data the unique identifier of the PEMD 100 to which it is intended to be sent. Transmitter-receiver 170 preferably includes transmitters and/or receivers operating for several different communication protocols and/or in several different bands, including but not limited to WiFi, Bluetooth and other networking communication, VHF and/or UHF bands, cellular telephone, 3G and 4G LET and other bands, so that PEMD 100 can communicate with auxiliary devices 130, 166W, 168 and via various relaying devices with a central location.

A crystal 172, or other frequency setting device 172, is provided to control the operating frequency of transmitter-receiver 170 so that data is transmitted and received at a predetermined frequency or frequencies, e.g., at about 433 MHz and/or other frequencies. Crystal 172 may also be utilized to control the clocking signals of processor 150, e.g., if processor 150 does not include a clock generator.

Memory 152 coupled to processor 150 may include volatile and/or non-volatile memory, e.g., EEPROM and/or RAM memory, for storing operating instructions for processor 150 by which operation of PEMD 100 is controlled, and for storing data captured by PEMD 100, e.g., by elements 120, 130, 140, 160 thereof and/or received by PEMD 100 via antenna 180 and receiver 170.

Data generated by PEMD 100, e.g., generated by elements 120, 130, 140, 160 thereof, is processed and transmitted substantially in real time, i.e. within less than a few seconds, and preferably in less than one second, of when it is generated, whether provided directly to transmitter 170 by processor 150 or indirectly via processor 150 and memory 152. The data generated by PEMD 100 is associated in memory 152 with the unique identifier of that PEMD 100 and so is related thereto to be uniquely identified therewith when transmitted.

Because GPS signals include precision time data, accurate time data is available and is preferably utilized to associate time data, e.g., a date-time stamp, with each data produced by PEMD 100. Thus, the combination of location data of locator device 162 and the accurate time data, all location data, motion sensor data and other sensor data may be and preferably is both geo-tagged to the location of PEMD 100 and with accurate time. Also preferably, time data, e.g., a date-time stamp, is communicated along with location data, motion sensor data and other data transmitted from PEMD 100. A clock operating with crystal 172 may be employed to maintain ongoing time data if external time data, e.g., time data from a GPS signal, should be lost Power source 112 typically includes a battery 112 with sufficient capacity to power PEMD 100 for at least 1.5 times the normal working period, e.g., shift, whether that be an 8-hour shift or a 16-hour shift. Power source 112 is preferably rechargeable, and desirably is exchangeable for a replacement, so that quick return to service with a full charge may be provided. For one example embodiment, a battery providing about 5 VDC and having a capacity in the range of about 3-6 W-Hr is expected to be adequate.

Where personnel gear and/or protective headgear shell 12 have plural receptacles 18, one or more extra fully charged batteries 12 may be carried in an otherwise unused receptacle 18 using a suitable case or housing. Regular and periodic recharging may be implemented by charger receptacles that receive complete headgear 10 in a position such that charging power is applied to battery 112, or by charging receptacles for individual or plural PEMDS 100, or by charging receptacles for individual or plural batteries 112. Preferably, the number of batteries 112 provided is sufficient for all of PEMDS 100 to have an operating battery 112 installed therein and for at least a like number of batteries 112 to be simultaneously charging in one or more battery charging receptacles.

Additionally, and/or optionally, supplemental power may be provided by solar cells attached to the exterior of shell 12 of protective headgear 10, and the solar cells when operating at peak output should provide about two times, and preferably about three times, the total operating power or PEMD 100 so that substantial recharging of batteries 112 may be provided. Preferably, the solar cells are attached in positions on shell 12 to maintain a comfortable weight balance of headgear 10 on a user's head, and by a suitable adhesive, e.g., a pressure sensitive foam having a peel strength of over 20 grams per inch, so that they do not move relative to shell 12.

Figure 4A:
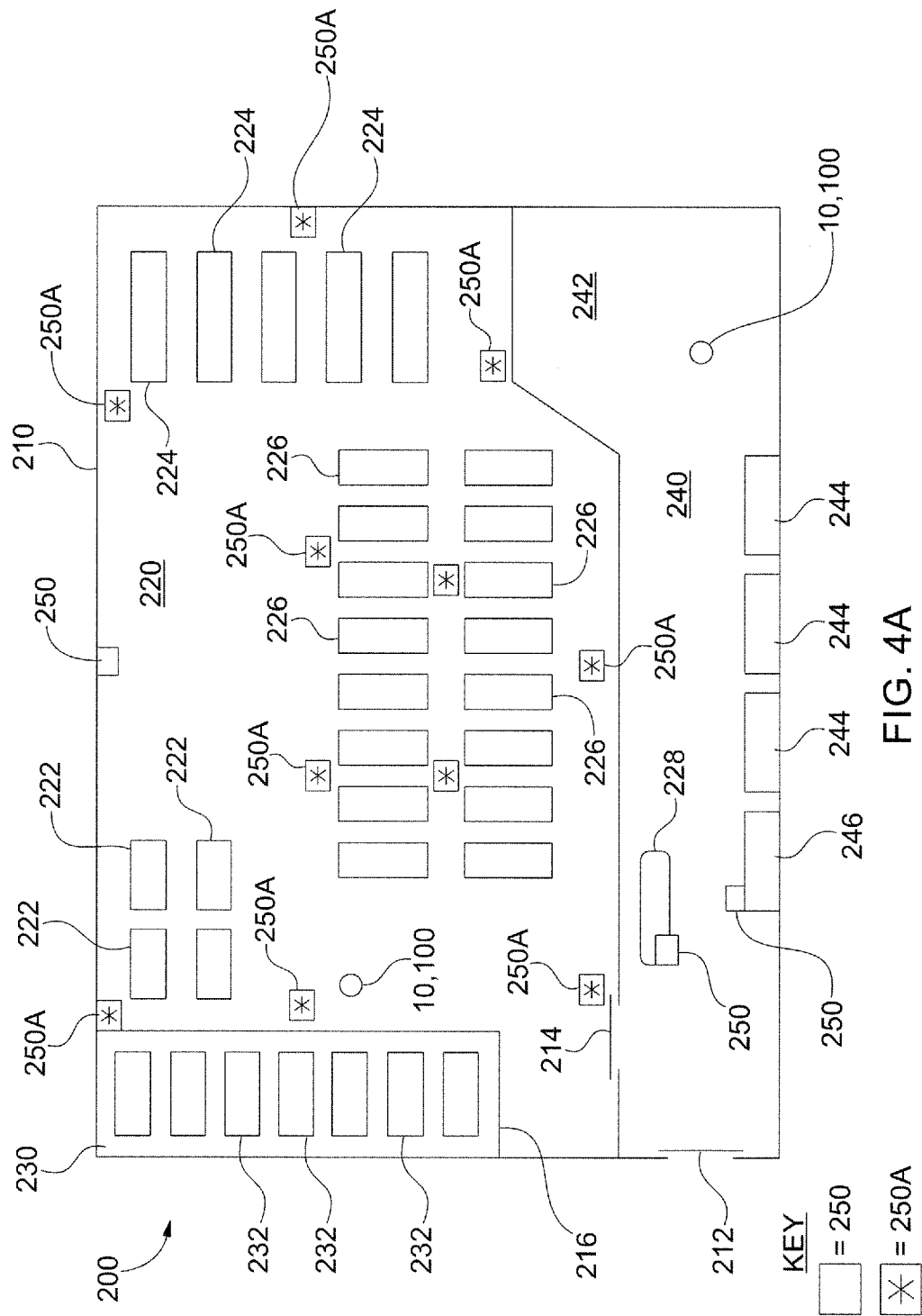
FIG. 4A is a plan view of an example location or site and FIG. 4B is an elevation of an example structure whereat the example system and protective gear of FIG. 1 may be employed.
Figure 4B:
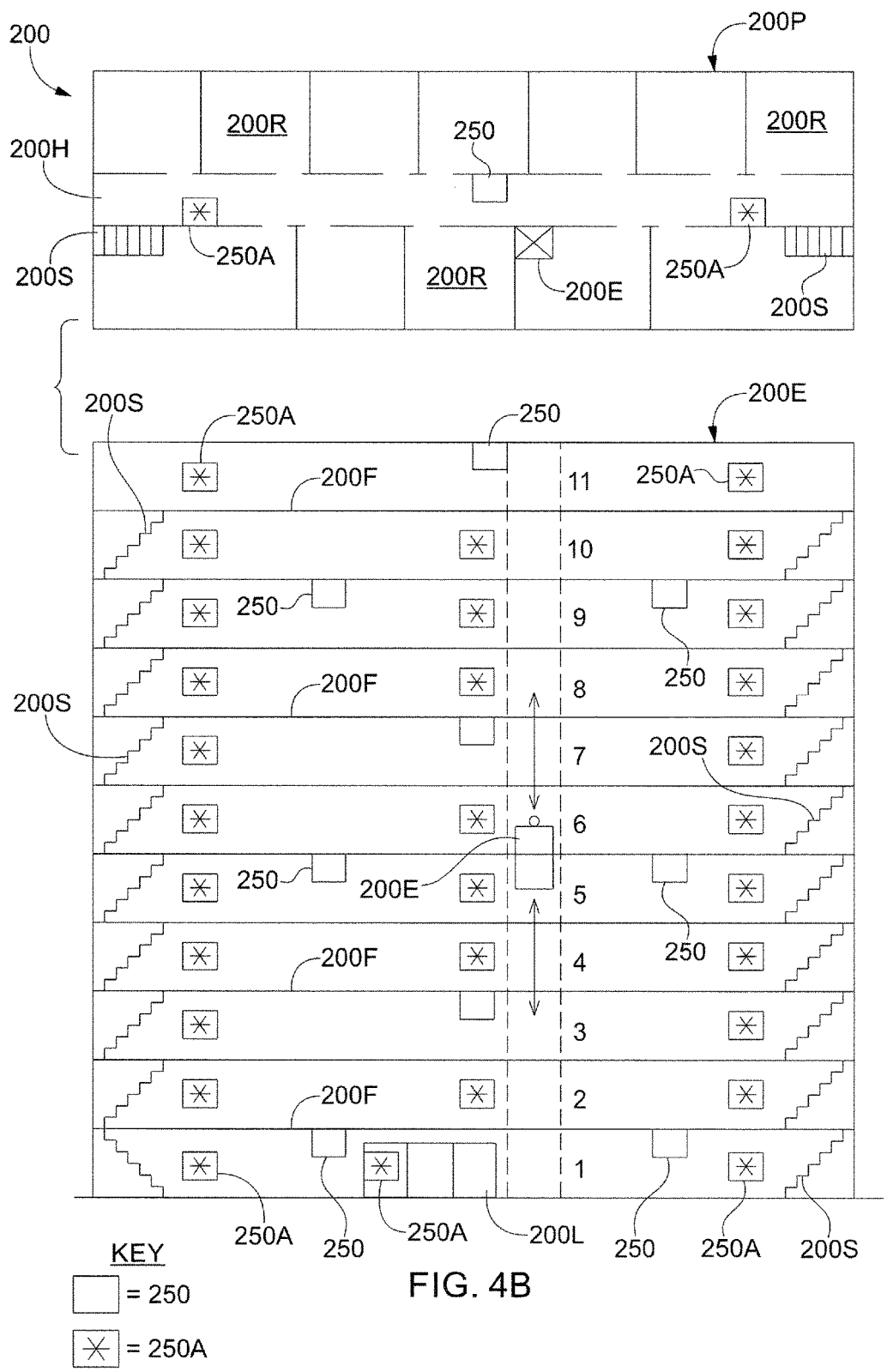

FIG. 4A is a plan view of an example location 200 or site 200 and FIG. 4B is an elevation of an example structure 200 whereat the example protective system and gear 10, 100 of FIG. 1 may be employed. Therein deployed portable communication devices 250A are represented by a square enclosing an asterisk. For safety and for security, access to site or structure 200 must be controlled and the location and status of personnel at the site must be monitored, and notifications, e.g., alerts, instructions, and warnings, should be sent should an untoward condition occur, e.g., personnel down or otherwise not animated, a release of a chemical or gas, a fire and/or explosion, an intrusion, or other condition that puts personnel safety or site safety or the environment at risk.

Example site 200 of FIG. 4A is for purposes of illustration and description, and may not conform to or represent any actual site. Illustrative site 200 is typically a site whereat hazardous and/or dangerous activities are conducted, e.g., drilling for oil or gas, or fracking (hydraulic fracturing intended to release an underground resource), producing and/or processing hazardous materials, and the like, and is typically surrounded by a perimeter fence 210 having a entryway or gate 212 through which vehicles and/or equipment may enter and exit, and to keep non-authorized person out for safety and security.

Inside perimeter fence 210, various portions of site 200 may be designated for different operations and storage, such as site management, site and safety monitoring, drilling, processing, equipment usage, equipment storage, chemical and gas storage, personnel housing, and the like, and certain areas, e.g., storage area 230, may be separately fenced 216 to limit access to storage containers and/or equipment 232 therein, whether fixed in place or movable.

In general, the principal operations conducted at site 200 would generally be conducted in a central region 220 thereof and supporting operations, reserve and storage would generally be placed nearer the periphery thereof. For example, a way for vehicle access 240 may be provided along an edge of site 200, including a turn-around area 240 at a convenient place, so that vehicles transporting supplies and equipment and the like to site 200 and/or removing product, supplies, equipment, expended items, trash and the like, have sufficient room to enter, maneuver, load and unload and exit.

Buildings 244, 246, which may be temporary or permanent, may be located in or near the vehicle access way 240 and/or turn around 242 where they are convenient to the site operations, and yet in a place not to interfere therewith. One building, e.g., building 246, may be utilized for site monitoring and management, a command center and/or a management office, while other buildings, e.g., buildings 244 may be utilized for personnel, e.g., for housing, dormitories, food service, recreation, on-site infirmary or clinic, training, and the like. A mobile command center 228, e.g., an "Alpha Dog" trailer, may also be utilized, either in conjunction with command center 248 or in parallel therewith, or in place thereof, as my be deemed convenient and appropriate.

Personnel entering site 200 via gate 212 or work area 220 via gate 214 should be checked for authorization to enter, e.g., using PEMD 100 and/or a personal identification badge. In addition, personnel entering work area 220 or any other dangerous and/or hazardous area, e.g., a "hard hat" area, should be checked to see that they are wearing their protective headgear 10 and that their PEMD 100 is active and operating. Identity may also be verified using their personnel identification badge, facial recognition, fingerprint scan or other means of positive identification. While manual and/or automated verification may be employed, the use of verifiable automated verification, e.g., video of the worker and his gear and/or headgear, is thought to be preferred.

Access to the site 200, work area 220, command center 228, storage area 230 and buildings 244, 246 is to be limited based upon personnel duties and responsibilities (sometimes referred to as "role-based" access), so that only personnel having a need to be in any particular area are authorized for such area, whereby personnel in unauthorized areas or out of their area can be automatically identified and receive appropriate notification via user interface 120, 130, and a management notification can also be provided, e.g., to command center 228 and/or management office 246. Such automated personnel locating and notification is preferably provided by a monitoring system as described herein.

It is noted that with the GPS locating described, each area is preferably defined by GPS coordinates and as operations move and/or change, area access can be appropriately modified by changing the GPS coordinates for such areas. As such, an "area" can be static, e.g., in a fixed location, or can be dynamic, e.g., move along with a change in operations and/or movement of supplies and/or equipment.

Thus, for example, as a tanker containing a hazardous material moves through gate 212 into access way 240, and then through gate 212 into work area 220, the restricted access area surrounding that tanker can be moved simply by changing its GPS coordinates. Where a GPS locator, e.g., a PEMD 100 is attached to the tanker, its location coordinates are transmitted substantially in real time to command center 228, 246 whereat the computer or server monitoring things and activities at site 200 can translate the GPS coordinates of the restricted are so that the restricted area moves with the tanker substantially at its center. As a result, notifications are automatically provided to management of unauthorized personnel being near the tanker and to personnel who are in a place that they should leave because it has become unauthorized for them due to tanker movement.

In addition to fenced storage area 230, storage of equipment and supplies may be provided in any area near the periphery that is not needed for the operations conducted at site 200, and plural storage areas 222, 224, may be provided in different locations. One storage area, e.g., area 222, might be used to store consumable supplies, e.g., water and chemicals for fracking operations, in fixed and/or mobile storage containers 222, e.g., tanks or tankers, or area 222 may contain support equipment 222 for the main site operation being conducted in a nearby, e.g., central, area. Area 224 might be used to store equipment 224, e.g., pumps, mixers, blenders, drilling rigs, cranes and/or forklifts, that support the central operation or perform an auxiliary operation. Equipment 226 of different sorts may be placed centrally to perform the main operation performed at the site 200, e.g., drilling, pumping water and chemicals and/or extracting product, and the like.

At one or more locations of site 200 are placed communication devices 250, 250A that communicate with protective gear 10, 100, and specifically the personnel electronic monitor device (PEMD) 100 of each protective gear 10 for relaying data and other communication from and to PEMDS 100. Each device 250 provides communication between any personnel electronic monitor device (PEMD) on site 200 to a central database, e.g., on a computer or server located on or near the site 200, e.g., in mobile command center 228 and/or in command center 246, which is remote from the user and PEMD 100, or located more remotely from site 200. Communication devices 250, 250A may be placed on fence 210, on free-standing posts, poles and/or towers, on equipment or any other place through which suitable communication can be established.

Preferably, each communication device 250, 250A includes an independent source of back-up power sufficient to operate device 250, 250A for at least three days, and preferably for at least seven days. Back-up power therefor may be provided by batteries and/or by solar cell panels. Power from AC mains that operates communication device 250, 250A and/or the solar cell panels can be used to maintain the back-up batteries fully charged.

Communication devices 250, 250A, e.g., relay devices 250, 250A, may use any type or kind of communication and/or any communication protocol compatible with PEMDS 100 for communicating data, signaling, voice and other messages thereto and therefrom. Relay devices 250, 250A may include a wireless radio transmission interface that includes functionality for cooperating with other relay devices to establish and maintain an ad hoc network wherein relay devices cooperate to relay reports of received identifying information from PEMDS 100 to command station 228, 246. Relay devices 250, 250A may be WiFi routers or "hot spots," or cellular and/or mobile telephone type towers, 3G and 4G links, and the like. A relatively shorter communication range of about 10-50 feet is preferred, as is a low power locating Bluetooth or RFID beacon powered by a battery, e.g., a lithium battery, having a battery life of 1-10 years. Communication may also be at frequencies in the range of about 430 MHz to about 1100 MHZ.

In addition, where the relay devices and/or hot spots 250 existing at site 200 are not of sufficient number and/or in suitable locations to accurately locate PEMDS 100, e.g., through ranging and/or triangulation, additional portable relay devices and/or hot spots 250A may be deployed around the site 200 so that their locations and spacings augment any relay devices 250 to locate PEMDS 100 to the desired level of accuracy. The additional relay devices and/or hot spots 250A are configured to search for other similar devices 250, 250A to join with them to form an ad hoc network. Thus, the existing network of relay devices 250, if any, is augmented to provide suitable performance, e.g., for suitable accuracy of locating of personnel and monitoring of operations.

Relay devices 250A may be prepared in sets each having a predetermined number of relay devices 250A as appropriate for the deployment plan, e.g., four sets of 10 relay devices 250A that can be carried in a pouch 50 carried by a responder, e.g., on his equipment belt, where three responders will ascend staircases of a ten story structure and one will ascend by elevator. Preparation of such sets may be done in advance or may be done while responders are en route to a site or structure 200. Additional relay devices 250A will be deployed at a predetermined separation, e.g., about 20-40 feet, which is within the communication range thereof, whereby personnel will typically be within range of at least two relay devices 250A at any time.

Relay devices 250A may in some instances be deployed and installed at sites and in structures subject to fire or other danger in advance of such condition coming into existence, in which instance they may be configured into a network as part of the installation procedure instead of forming an ad hoc network which is a preferred configuration. The interrogation or "beeping" rate of relay devices 250A is preferably in the range of about 0.5 to 10 seconds and more preferably in the range of about 1-3 seconds for providing locating substantially in "real time" and extending battery life. Maintenance of relay devices 250, 250A for proper operation and whether battery replacement is needed should be performed on a predetermined schedule, e.g., about 3-12 months, and may be performed by bringing a reader device nearby to interrogate the relay device 250, 250A where the relay device 250, 250A is configured to report its status and condition when interrogated.

Examples of wireless communication and network interfaces that may be employed include, but are not limited to, known network technology and protocols such as an IEEE 802.11x type network, an IEEE 802.15.x type network, a Bluetooth network, a "Wi-Fi" network, a "ZigBee" type network, an EmberNet ad hoc network (Ember Corporation, Boston, Mass.), RFID communication, microwave and/or fiberoptic links, a cellular network, a satellite network, as well as any other present and/or future communication and network technology and protocols. The forgoing may be supplemented by Internet and/or telephone access, if and as available. Combinations of any or all of the foregoing types and kinds of communication may be employed in provided the communication between and among the elements described herein.

Preferably, communication relay devices 250, 250A will employ a communication protocol that has substantial range so that fewer devices 250, 250A will be required, however, it is provided that sufficient portable relay devices 250A are deployed to establish an ad hoc network or to connect with and augment an existing network. For this reason a WiFi or similar protocol is preferred in combination with the described PEMDS 100 employing GPS locator devices 162 over, e.g., an RFID protocol, where a larger number of relay devices 250, 250A is necessary to obtain a suitable PEMD locating accuracy. For a typical site 200, between one and four communication relays 250 should be sufficient, although a greater number may be and often are provided to enhance communication reliability and locating accuracy. In this preferred arrangement, the higher cost and complexity of needing many RFID relays is avoided by using a simpler and less expensive WiFi network that covers a larger area, which tends to offset the additional cost of using a GPS locator 162 in PEMDS 100. Also, the increased operational, efficiency and safety resulting from using more accurate GPS locating is likely to be seen as being worth the cost of implementing GPS locating in each PEMD 100.

FIG. 4B includes an elevation and plan view of an example building structure 200 that may have an existing WiFi or other network that can be augmented by deploying portable communication relay devices 250A to provide a suitable ad hoc network. Example structure 200 comprises a multi-story building having a plurality of floors or levels 200F, each typically having a hallway 200H and a plurality of rooms 200R. Depending on how the structure 200 is utilized, it may or may not have an existing WiFi or other network or communication facilities 250 in place. Example structure 200 of FIG. 4B is for purposes of illustration and description, and is not intended to conform to or represent any actual structure.

Wireless communication devices 250 existing in example structure 200 include a single communication device 250 centered in a hallway 200H on the third, seventh and eleventh floors 200F thereof and two spaced apart communication devices 250 on floors one, five and nine, possibly to take advantage of the fact that communication signals at certain frequencies, e.g., WiFi signals, penetrate walls and floors to a certain extent. While that arrangement may be satisfactory for occupants of the building who might tolerate a weaker and/or slower connection, it is likely not satisfactory for locating and tracking, and communicating with, personnel deployed in structure 200 under conditions that may be hazardous and/or dangerous.

To improve locating accuracy and communication, additional communication devices are deployed in structure 200, e.g., at or near the opposite ends of certain floors 200F and/or relatively centrally on other floors 200F so that on each floor there are at least three portable communication devices 250, 250A distributed throughout each floor. First responders enter structure 200 via an entrance or lobby 200L and so a portable communication device 250A may be placed near to the entrance or lobby 200L to provide data indicating all of the personnel who enter and/or leave thereby. Similarly, since first responder personnel often use stairways 200S, it is a convenient and easy to identify location at which personnel climbing the stairways 200S can place portable communication devices 250A near to stairway entrances so that very good locating accuracy and communication is established as personnel enter each floor. Since elevators 200E are often located adjacent a hallway 200H at or near the central region of each floor 200F, that is often a convenient and easy to identify location at which to deploy portable communication devices 250A, especially where the nature of the situation makes use of elevators 200E safe.

Locating, tracking and monitoring personnel, and their condition, and communicating with personnel, in relation to structure 200 is substantially similar to that described herein in relation to the example site 200, and so is not repeated here.

In many locales, building plans and layouts, such as those examples represented in FIGS. 4A and 4B, as well as inventories of hazardous or dangerous materials and/or equipment are maintained for use by fire, police and other first responder personnel. Preferably these records are stored in an electronic database that first responders can access from remote locations via a wireless communication link as they are responding to a call so that they can evaluate conditions and develop plans for operations prior to arrival at the site, e.g., including whether there is a need for deploying portable communication devices 250A and if so, where such devices 250A should be placed to provide the desired level of locating accuracy and communication reliability.

In practice, upon deployment and activation, portable communication relay devices 250A are configured to initiate communication with each other to interconnect wirelessly and establish a suitable ad hoc network in known manner. For example, U.S. Pat. No. 7,436,789 entitled "AD HOC WIRELESS NODE AND NETWORK" relates to ad hoc networks. U.S. Pat. No. 7,436,789 is hereby incorporated herein by reference in its entirety.

Where an ad hoc wireless network of relay devices 250A is not sufficient to establish communication with remote facilities, e.g., a command center 228, 246 and/or central facility 310, additional relay devices 250A may be deployed for communicating via a cellular network or other network to provide such communication.

Portable communication devices 250A are preferably configured so as to be easily mountable in and/or attached to a structure or a conveniently available object therein. To this end, portable communication devices 250A may be configured to have a communication module that contains all of the functional and operating elements thereof and a base 250B to which the communication module attaches. The base 250B and/or various different bases 250B thereof are preferably configured to be easily and quickly attachable to various objects, and so may include one or more of a zip tie for attaching to a pipe or door handle, a magnet for attaching portable communication devices 250A to a steel object, e.g., a door or structural beam, an adhesive or pressure sensitive adhesive for attaching portable communication devices 250A to a floor or wall or other surface, or a tapered screw or barbed nail for being driven into an object, e.g., into wall board or a wooden object, for attaching portable communication devices 250A thereto, or a combination thereof.

Figure 5:
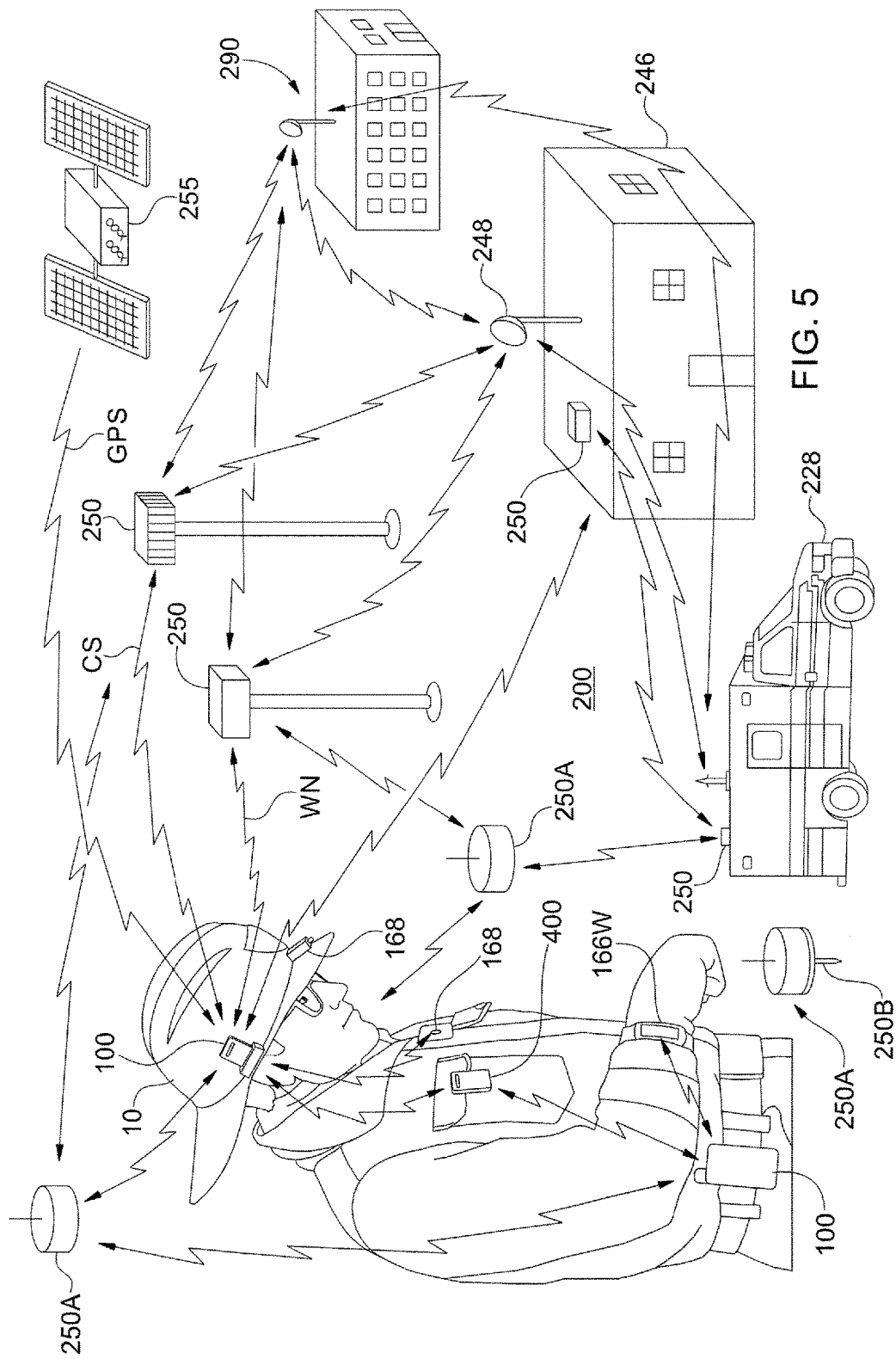
FIG. 5 is a schematic diagram illustrating the example system and protective gear employed at an example location or site and in conjunction with an example embodiment of a personnel identification badge.

FIG. 5 is a schematic diagram illustrating the example system and protective gear 10, 100 employed at an example location or site 200 and in conjunction with an example embodiment of a personnel identification badge 400. Protective gear 10, personnel electronic monitoring devices (PEMD) 100, and site 200 are typically as described herein. Communication devices 250 may be a WiFi node 250 which provides and communicates via a wireless network WN, or may be a portable ad hoc network node 250A, or may be a mobile or cellular device 250 which provides and communicates via a cellular network CS, or may be any other suitable communication device.

Communication between elements 100, 250, 250A, 228, 246 at a site or structure 200 and a central facility 290, is configured to allow each to freely transmit data to and/or receive data from one another. Central facility 290 typically includes, e.g., one or more servers and/or computers thereat that process data, create and maintain a relational database of all data transmitted thereto. Central facility 290 and/or command centers 228, 246, may generate and dispatch alerts, instructions, warnings and other notifications directly or indirectly to personnel 30 via their PEMDS 100 as needed. Central facility 290 may communicate via microwave link, cellular network and/or any other type or kind of communication link with on-site command center 228, 246 (e.g., via a communication antenna 248).

Communication links and paths are indicated schematically by jagged double-ended arrows, which in the case of communication between fixed structures may include physical links such as fiberoptic and electrical cables in addition to wireless communications (representative communication paths are shown; every possible path may not be shown). Preferably elements 100, 250, 250A, 228, 246 are configured such that communication between any pair of elements 100, 250, 250A, 228, 246 is available via several different communication paths and/or protocols, so that robust communication, including locating, tracking and monitoring of personnel, is provided even in difficult and unpredictable environments.

Also illustrated is an example satellite 255 which is one of several that are part of a multiple satellite-based locating system of the types described herein, e.g., the US GPS satellites, and that transmit precise position and time signals from which the locator device 162 of each PEMD 100 can accurately determine its position substantially in real-time, so that PEMD 100 location data can be transmitted substantially in real time.

Personnel (e.g., a first responder or worker) 30 may carry, in addition to PEMD 100 of his gear 10, a personnel identification badge 400 which includes electronic circuitry for communicating with PEMD 100, e.g., using RFID technology, Bluetooth, ZigBee or any other suitable communication protocol, and via PEMD 100 with one or more of command center 228, 246 and remote facility 290. Each personnel identification badge 400 has a unique identifier stored therein which is associated with all data generated and all data transmitted by each badge 400, and so each badge 400 and its unique identifier is associated with the person to whom the badge 400 is issued, and with the protective gear 10 and PEMD 100 used by such person. While identification badge 400 may be separate from PEMD 100, it may be integrated therewith.

While each PEMD 100 is associated with a particular article of protective gear 10, that particular gear 10 and/or PEMD 100 may or may not always be associated with a particular person 30, even if it is assigned to and intended to be worn by a particular person 30. Typically protective gear 10 tend to look alike and so can easily be mixed up, even if unintentionally, and so may not reliably serve to identify the particular person 30 who is wearing any particular article of gear 10. That ambiguity tends to be reduced, if not avoided and resolved, because the unique identifier of each personnel identification badge 400 is associated with the data generated and transmitted by the PEMD 100 used by the person carrying a personnel identification badge 400.

Personnel identification badge 400 is, however, more closely associated with a particular person because it is typically used for controlling access, work, attendance and work time recording, e.g., to clock personnel 30 in and out, and thus affects their being paid, so each worker 30 has a personal incentive to safeguard and retain his identification badge 400 in his personal possession. Thus, badge 400 is seen to be a more reliable and consistent means for personnel identification and monitoring, and to that end may also provide photo identification. When badge 400 and PEMD 100 communicate, their respective unique identifiers are relationally associated with each other, and are communicated to command center 228, 246 and/or at central facility 290, so the monitoring and tracking relational database at command center 228, 246 and/or at central facility 290 relates a particular badge 400 (and thus the person 30 to whom it is issued) to a particular PEMD 100 (preferably, but not necessarily, the PEMD 100 intended to be carried by a person and associated with that person's gear 10).

Either or both of gear 10 with PEMD 100 and personnel badge 400 may be utilized for controlling access into and out of site or structure 200, as well as into and out of any area or gate or facility therein. Typically badge 400 employs a communication protocol and power level that affords a relatively short range (e.g., relative to the size of site or structure 200) and so would be passed relatively closely to a badge reader, e.g., at a gate 212, 214 or lobby 200L or other access control station or station. Preferably, when personnel seek access, the respective unique identifiers of their badge 400 and PEMD 100 are associated with each other so that real time monitoring of PEMDS 100 will also encompass real time monitoring of particular personnel.

Figure 6:
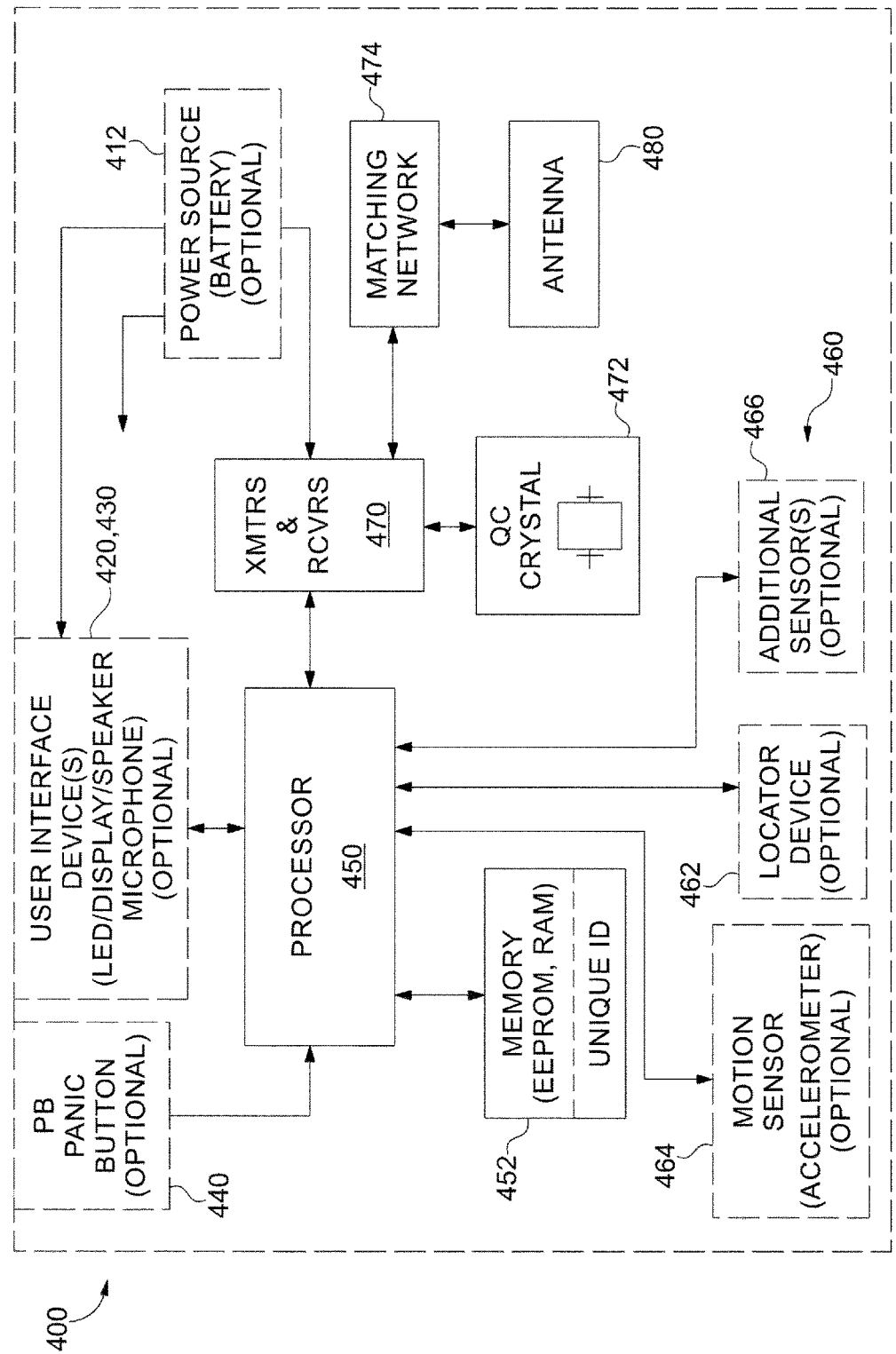
FIG. 6 is a schematic block diagram of an example embodiment of a personnel identification badge employed in conjunction with the example system and personnel electronic monitor device of FIG. 2.

FIG. 6 is a schematic block diagram of an example embodiment of a personnel identification badge 400 that may be employed in conjunction with the example system and protective gear 10, 100 of FIG. 2. In general, the elements and functions of badge 400 are substantially similar to those of PEMD 100 except that certain elements found in PEMD 100 may be, and preferably are, eliminated, as indicated by their being shown in dashed line, and certain operating differences may be made as described.

Badge 400 may in some instances be the same functionally as PEMD 100 and may be contained in a housing of a different configuration or of the same configuration as is PEMD 100, and in other instances may be combined into PEMD 100. In this instance, it is preferred that badge 400 become associated with the gear 10 and PEMD 100 of one person by associating their respective unique identifiers and thereafter maintaining that associational relationship so that data from both devices 100 and 400 is linked and can be compared for increasing confidence in the accuracy thereof or the duplicative data may simply be deleted once confirmed to be duplicative.

For example, where badge 400 is to be utilized only for identification and access control purposes, it operates similarly to an RFID tag (although another form of communication protocol may be utilized) and user interface devices 420, 430 are not needed and may be eliminated as may panic button 440. Regarding sensors 460 in such instance, locator device 462 and motion sensor 464 also are not needed and may be eliminated, as may any other (optional) sensors 466, particularly where the same parameters are sensed by elements of PEMD 100. Further, processor 450 may be so simple that it substantially is no longer a processor, but simply a comparator for comparing a received RFID identifier to the unique identifier stored in memory 452 (which itself is a very minimal memory), and producing a response code from memory 452 if the received RFID identifier matches the stored unique identifier of badge 400.

Badge 400 is an identification device that may be configured in any of many different forms, e.g., a badge, tag, card, clip, lanyard, wristband, embedded device, whether removably or permanently attachable, or in any other convenient form, shape or size that can be carried by a person. It is also noted that badge 400 may employ the same circuit and structure as PEMD 100 although certain functions and/or elements thereof may be modified, deactivated or removed. In certain configurations, e.g., where the transmitter-receiver 470 is a passive responder, as in passive RFID tag technology that responds only when interrogated using energy captured from the interrogation signal, battery 412 is not needed and so may also be eliminated. In other configurations, the battery 412 is retained if the recharging and/or replacement of a battery 412 therein is acceptable in regards to a personnel ID badge.

Communication between badge 400 and PEMD 100 is preferably via wireless communication having a relatively short range that is more than sufficient for the typical distance, e.g., about 12-36 inches (about 0.3 to 1 meter) between the head (headgear 10) and belt or pocket (pants or shirt), of the person wearing both that badge 400 and that PEMD 100. Thus, badge 400 and PEMD 100 may communicate via an RFID or Bluetooth protocol, or a similar protocol. Preferably, once a particular PEMD 100 is associated with a person and his personnel identification badge 400, and their respective unique identifiers, communication therebetween includes one or both of those identifiers so that each positively recognizes and communicates only with the appropriate other one.

Figure 7:
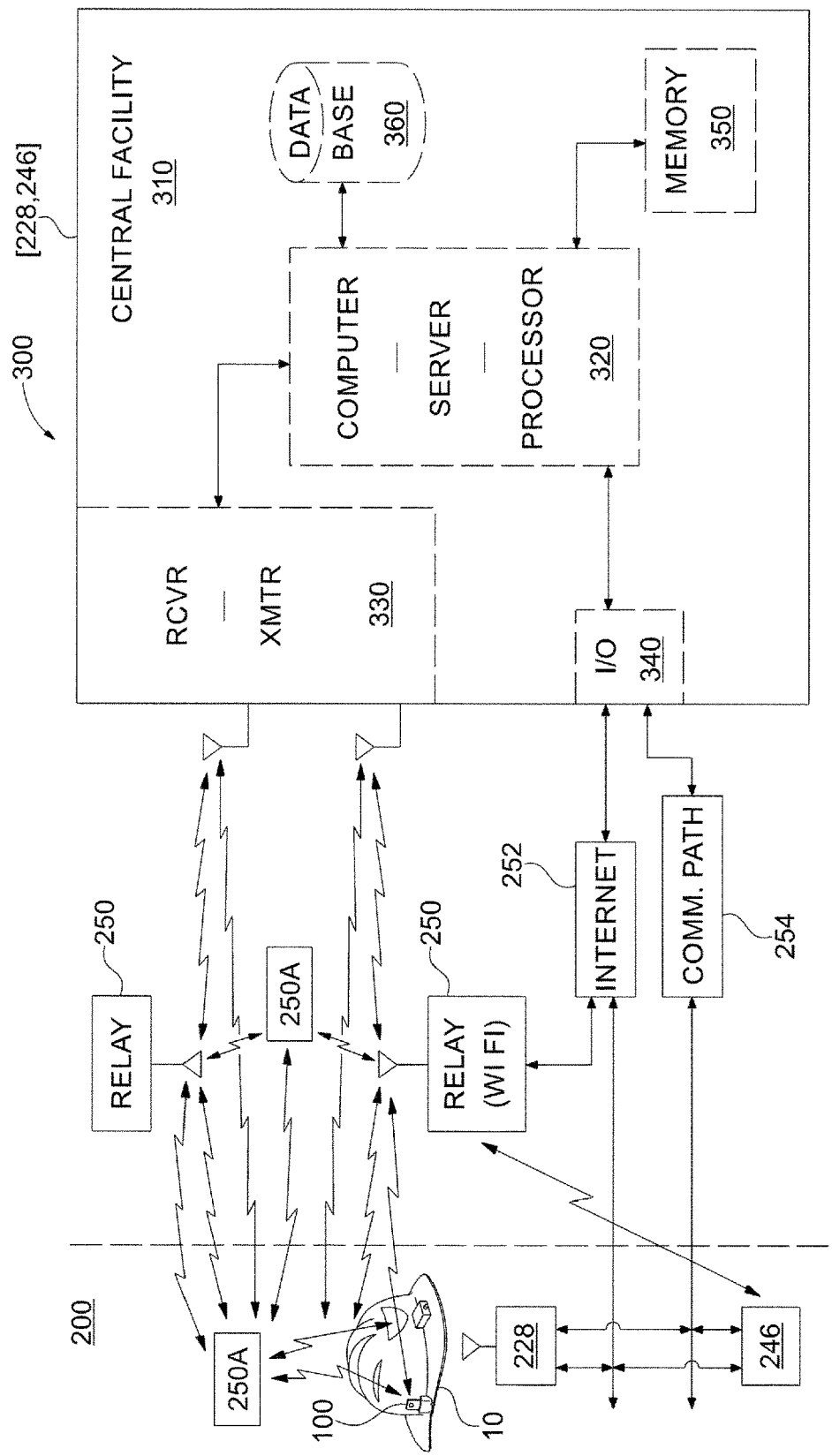
FIG. 7 is a schematic diagram of an example embodiment of a remote monitoring station suitable for use with the example system and devices of FIGS. 1-6.

FIG. 7 is a schematic diagram of an example embodiment of a remote monitoring station and system 300 suitable for use with the example system and devices 10, 100 of FIGS. 1-6. System 300 includes a monitoring station 310, e.g., a central monitoring facility 310 which may be separate from and/or in addition to command centers 228, 246, or may be command center 228, command center 246, or command centers 228 and 246. Monitoring station 310, e.g., a central facility 310 and/or a command center 228, 246, includes a processor 320 which may be a server, a computer, a laptop computer or any other computer processor suitable for adding records to, relating records stored in, generating notifications from, and maintaining, a relational database.

Monitoring station 310 includes communication resources such as wireless receiver-transmitter 330 by which data is received wirelessly (illustrated schematically by double-ended jagged arrows) from one or more PEMDS 100 either directly or indirectly via one or more relays 250, 250A or via a command center 228, 246. Facility/center 310 also includes communication resources such as input-output device 340 by which data is received from PEMDS 100 either via the Internet 252 or via one or more other communication paths 254 indirectly via one or more relays 250, 250A and/or via command centers 228, 246.

Associated with processor 320 is a memory for storing operating and application programs, and other computer programs and/or data needed for operating processor 320. Also associated with processor 320 is a relational database 360 in which is stored database records containing data received from PEMDS 100 and protective gear 10 substantially in real time, and containing building plans and diagrams that can be remotely accessed and retrieved for operational planning and execution as described. However, where PEMD data is relayed via a command center 228, 246 that monitors and responds to such PEMD data substantially in real time when warranted, PEMD data may be but need not be forwarded to central facility 310 substantially in real time, but may be forwarded from time to time, e.g., for archiving and/or review.

As described, PEMD data includes location data and motion data that is associated with the unique identifier of the PEMD 100 that produces and transmits such data. Database 360 (or memory 350) also includes GPS coordinates for site or structure 200 and for each area, e.g., areas 220, 230, 240, 242, floors 220F and stairs 200S, and object, e.g., fences 210, 230, gates 212, 214, equipment 222, 224, 226, 228, 232, 244, 246, therein as well as GPS coordinates for each PEMD 100 that define the areas, objects and equipment that the PEMD 100 (by its unique identifier) is permitted and/or not permitted to be in or at, as well as for areas to which personnel may be assigned and/or physically present. It is noted that defining permitted areas, objects and equipment may be sufficient to define by exclusion the areas that are not permitted, and vice versa, although both may be defined, as may unrestricted areas, objects and equipment. The database also receives from PEMD 100, e.g., via communication relays 250, 250A etc., and stores location data for each PEMD 100 and for each relay 250, 250A deployed, as well as data from any sensor associated therewith, all of which is relatable by, e.g., PEMD, location and other parameters.

As PEMD data is received the location data therein is related by its unique identifier data and thereby compared against the stored GPS coordinates for its assigned locations, permitted and/or not permitted areas, objects and equipment substantially in real time, and when presence in a non-permitted area or at a non-permitted object or equipment is identified or absence from a permitted area, object or equipment is identified, notification thereof is generated and is transmitted directly or indirectly to the PEMD 100 having that unique identifier substantially in real time, and is preferably also transmitted to a management notification for monitoring and or further action, and may be transmitted to other PEMDS in particular locations, e.g., as notifications of conditions and/or instructions, as may be appropriate.

As PEMD data is received the motion data therein is related by its unique identifier data and thereby compared against stored criteria for allowable periods of lack of movement, e.g., which may typically be in the range of about five to thirty seconds, and which may vary depending upon the nature of the danger or hazard associated with the particular area, object or equipment in or at which the PEMD 100 is then present. When lack of movement for a period exceeding the predetermined threshold is identified, notification thereof is generated and is transmitted directly or indirectly to the PEMD 100 having that unique identifier substantially in real time, and preferably is also transmitted to a management notification for monitoring and or further action as may be appropriate. The foregoing tracking, monitoring and notification generation is preferably independent of and separate from the PEMD 100 which also internally processes the location and motion and time data it generates to track location, motion and time, to generate therefrom and provide notification, e.g., an audible and/or visible indication, at the PEMD 100.

Where PEMD 100 is employed in association with a personal ID badge 400, data therefrom including its unique identifier is associated with the unique identifier of that person's PEMD 100 and are stored in relational database 360, whereby the comparisons and the data and notifications generated thereby are associated with a particular person and the particular PEMD 100 of protective gear 10 used by that person, whereby more complete and useful notifications can be provided.

Figure 8:
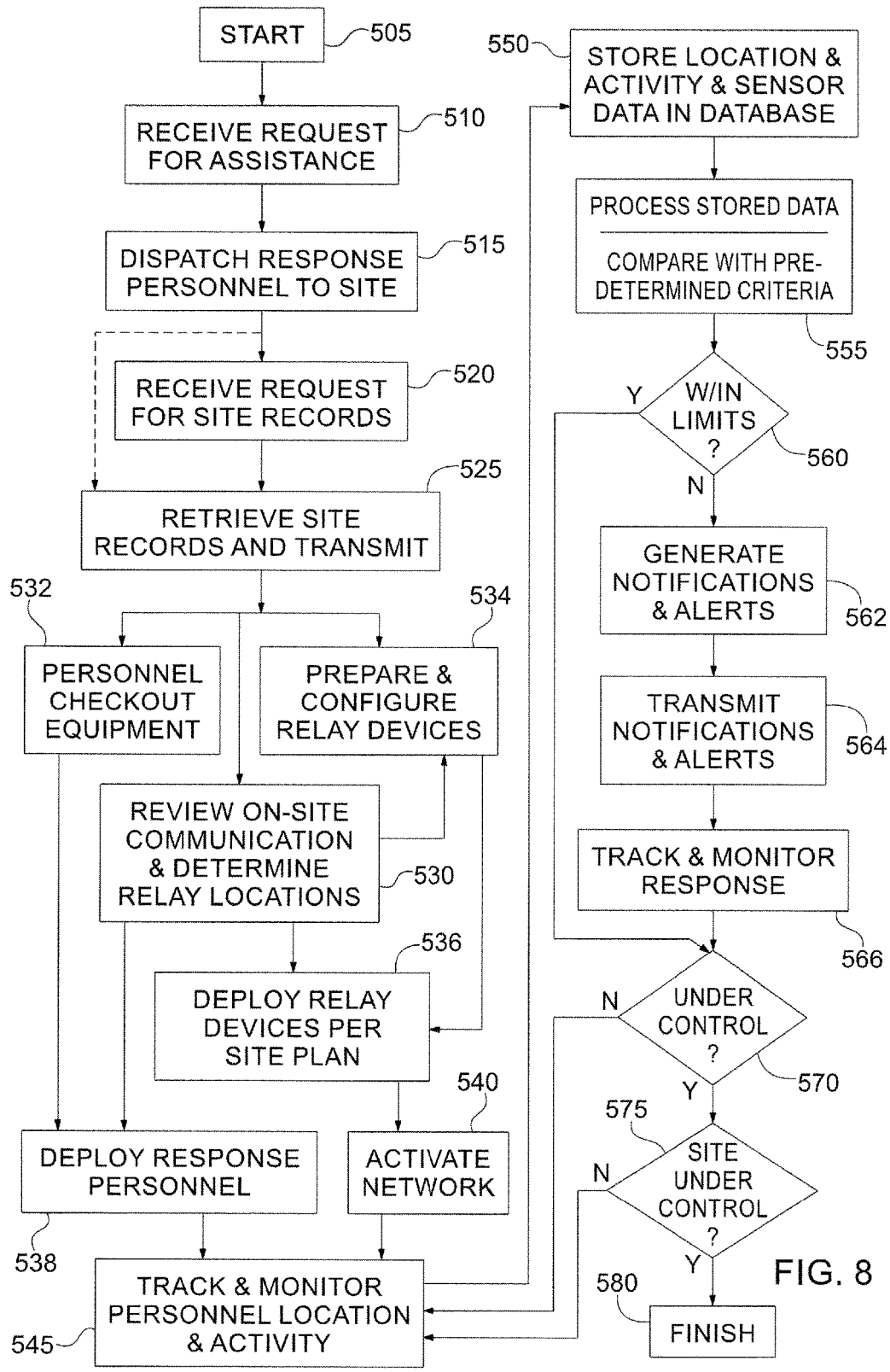
FIG. 8 is a schematic block diagram of the system and method described herein.

FIG. 8 is a schematic block flow diagram of the system and method 10, 500, described herein. Method 500 begins 505 with receiving 510 a request for assistance, e.g., a report of a fire, accident, hazardous spill or leak, and the like, at a site. The term site encompasses sites, plots of land, buildings, structures and facilities of any and all types and/or kinds, whether fixed in location or mobile, permanent or temporary, large or small. Typically the request is received 510 via telephone, text, e-mail, web site communication, or other format, e.g., to a 9-1-1 call center, from a person at or near to the site who has recognized the condition, from an alarm or other sensing arrangement, from a security service or a watching service or an alarm monitoring service, or from a combination thereof. If the request for assistance 510 is not already logged into the responder's computer system, it is entered either by personnel thereat or automatically. The received 510 request is processed to dispatch 515 response personnel, e.g., firefighters, police, hazardous response teams, and the like, to the site of the reported incident.

While the dispatched personnel are en-route, records relating to the site are retrieved 525, e.g., by a command and control center, either as a predetermined part of the dispatching step 515 or in response to a request received 520 from the responding personnel. Where the data and records relating to the site are already in electronic form, they are directly transmitted 525 to the responding personnel whilst en route, e.g., electronically such as by wireless communication to a receiving device carried by the responding personnel, e.g., a PEMD 100, and/or by the vehicle in which they are being transported. However, if the data and/or records are not in a form suitable for transmission 525, then they are quickly scanned or otherwise converted into a form that is suitable for wireless or other electronic transmission 525.

Data and records provided preferably include those relating to, e.g., site plans, building and structure plans, utility maps, flammable and hazardous materials present, operational information, and the like. It is thought to be highly desirable that the data provided include to the extent available plans, records and other information relating to WiFi networks, cellular networks, other communication networks and other equipment that is or may be present and useful for locating personnel, e.g., locating beacons, and/or for communicating at the site, and what their operational status may be. Additional and/or updated data may be provided, and preferably is provided, to the responding personnel, e.g., as it becomes available, including after they have arrived at the site and/or while they are conducting a response thereat.

Typically, such data and records are provided to a command center 228, 246 and/or to personnel in charge, e.g., usually to equipment that they employ, so that they can review 530 the data and records, and can formulate a plan 530 for addressing the reported condition. Part of planning 530 includes determining what facilities, if any, are available at the site for locating personnel at the site and to determine 530 the locations at which relay devices 250A are to be deployed, e.g., to augment existing relay devices 250 and/or locating beacons 250, or to establish a locating, tracking and/or monitoring network. FIGS. 4A and 4B herein are examples of one sort of plan illustrating locations of existing relay devices 250 and possible and/or preferred deployment locations for portable relay devices 250A as described.

The deployment plan is communicated to responding personnel who are checking out 532 their equipment and gear while en route, and at least some personnel who prepare and configure 534 portable relay devices 250A en route in preparation for their deployment 536 per the plan and activation 538. Checking out 532 of personnel equipment typically includes activating each responder's PEMD 100 and its associated video imager 168, wrist carried biological monitor 166W, and the like, as well as checking 532 that such devices communicate with each other, with portable relay devices 250A and with the communication devices and equipment carried by the commanders and present with the command center 228, 246. Configuring 534 the portable relay devices 250A may include, e.g., predetermining the communication protocols they utilize, setting transmit power levels and/or ranges, defining message priority and timing, defining devices 250A to serve as nodes for a particular communication protocol, e.g., cellular communication, and/or other characteristics and operating protocols.

Upon arrival at the site, response personnel are deployed 538 in accordance with the operating plan developed 530 with at least some of the response personnel assigned for deploying 530 portable relay devices 250A as they move into and about the site, e.g., near stairways 200S and elevators 200E and in hallways 200H and other passages, and activating 540 the portable relay devices 250A as they are deployed in such locations, if not previously activated 540. The personnel first to ascend each stairway typically deploys pre-configured relay devices 250A as they ascend as do the first personnel to ascend by elevator, while those personnel or others may move about to deploy pre-configured relay devices in hallways 200H, at intersections of hallways 200H, and at other locations in accordance with a deployment plan, as well as at entrances and exits, in lobbies and other access points where responders tend to be present and/or gather.

The in-place relay devices 250 and the deployed portable relay devices 250A cooperate for relaying communications between PEMDS 100 and command centers 228, 246 and/or central facility 310 as personnel operate at the site 200. At the same time, PEMDS 100 and relay devices 250, 250A cooperate to locate 545 the personnel (their PEMDS 100) within the site 200 by employing the GPS and/or another locating function of PEMDS 100, and/or locating 545 PEMDS 100, e.g., by ranging and/or triangulation, relative to relay devices 250, 250A. Because each PEMD 100 is located substantially continuously and each location determined is time stamped, system 100 and method 500 receives data that tracks 545 each PEMD 100 and the personnel wearing same in space and time as well as facilitating the monitoring 545 of the locations of all PEMDS 100.

In addition, because the data communicated to command centers 228, 246 and/or central facility 310 includes data obtained from one or more sensors carried by PEMDS 100, by biological monitors 166W and/or by still and/or video imagers 168, the physical and health condition of personnel, as well as conditions at the site 200, can also be tracked and monitored 545 as facilitated by the linking of such data in location, e.g., by geo-tagging with the PEMD 100 location, and a date time stamp. All such data received is stored 550 in a relational data base wherein related data is linked by at least the unique identifier of the PEMD 100 from which it was received as well as the location and time at which it was originated.

The relational database may reside in computer resources at command centers 228 and/or 246, and/or at a central facility 310, and if such computer resources are at more than one location, then it is preferred that communication between such computer resources be provided, e.g., by any suitable communication link or links, so that the data stored at all of the locations are substantially the same at any given time, or at least is updated with sufficient regularity that all locations are operating based on substantially the same data.

Preferably command centers 228, 246 and/or central facility 290 process 555 the received and stored data to generate 555 therefrom information that is representative of conditions at the site 200 and of the personnel thereat that can be employed to track and monitor both personnel and operations at the site 200. In addition to tracking and monitoring of personnel and operations, the received and stored data is processed by being compared 555, 560 with predetermined standards and criteria relating, e.g., to safety and performance limits of personnel and to the safety and progress of operations.

If the compared 555 data and predetermined criteria indicate 560 that a parameter is not within limits, then path 560—N is followed, and a notification and/or alert and/or report thereof is generated 562 and transmitted 564 to the command center 228, 246 personnel as well as to the PEMD 100 of personnel involved or nearby to the location to which the alert and/or notification pertains. The response by command center personnel as well as personnel affected by such alerts and notifications is tracked and monitored 565. If the condition is not under control 570, then path 570—N is followed and the cycle of tracking and monitoring 545-570 is repeated until the conditions that initiated the notification and alert is under control (570—Y), including the overall condition that originally initiated the call for assistance 510, are under control.

If the compared 555 data and predetermined criteria indicate 560 that a parameter is within limits, then path 560—Y is followed to the test 570 which will follow path 570—Y since there is no condition to be out of limit, although a notification and/or report thereof may be provided. Then a determination 575 is made as to whether the entire site and situation, e.g., the overall condition that originally initiated the call for assistance 510, is under control. If all is not under control, then path 575—N is followed and the cycle of tracking and monitoring 545-575 is repeated until all conditions, including the overall condition that originally initiated the call for assistance 510, are under control. When all personnel, conditions and situations are determined 575 to be safe and under control, e.g., the operation is completed, path 575—Y is followed to finish 580 the operation.

Thus, system 10 and method 500 are configured to provide locating, tracking and monitoring of personnel and conditions through out an involved site and/or structure in a way intended to lead to a safer and more information rich environment that assists responders, e.g., fire, police and other responders, to respond to, address and bring under control situations and circumstances that are dangerous to life, limb and property with improved safety and efficiency.

Figure 9:
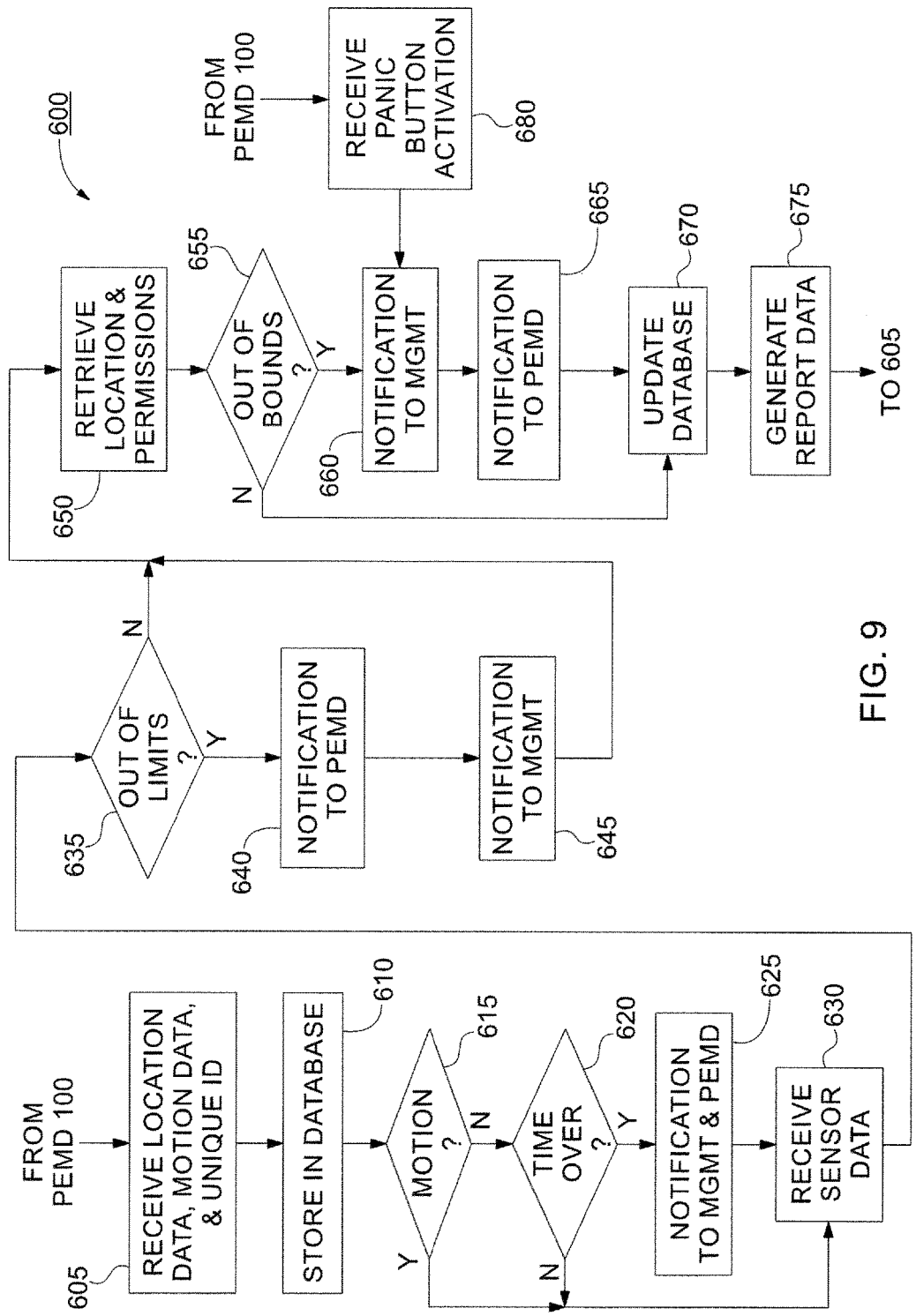
FIG. 9 is a schematic block diagram illustrating an example embodiment of the operation of the example monitoring station of FIG. 7 with the example devices of FIGS. 1-6.

FIG. 9 is a schematic block diagram illustrating an example embodiment of the operation 600 of the example monitoring station 310 of FIG. 7 with the example PEMD devices 100 of FIGS. 1-6. Operation or process 600, which typically may be a sub process within or paralleling process 500, begins with receiving 605 location data, motion sensor data and a unique identifier from a PEMD 100 and storing 610 that record in a relational database. Preferably, all data associated with the foregoing data, e.g., date-time stamps, other sensor data and the like, is all stored in the same data base record or in separate database records that are related by the PEMD unique identifier, location and date-time stamp.

While the order in which the comparison or testing steps 615-665 now to be described are performed is not especially important because the entirety of process 600 is preferably completed in one or two seconds or less, they are illustrated in an example order that tests personnel condition (animation) first, dangerous and/or hazardous conditions next, and then tests personnel location relative to permitted and prohibited locations (permissions).

Motion testing, e.g., for personnel animation, first tests 615 the motion data for whether or not movement has been detected. If motion is detected, 615—Y, then the personnel is animated and presumed normal and path 615—Y leads directly to step 630. If no movement is detected, 615—N, then using related database records the time during which no movement has been detected is tested 620. If the no movement time exceeds 620—Y a predetermined threshold above which it is presumed that there is no animation of that personnel, then 620—Y a notification to management is generated 625 so that appropriate investigation and/or assistance can be provided. Preferably, when no animation is determined, an alert notification is also transmitted 625 to the PEMD 100 that produced the data indicating lack of movement to provide an audible and/or visual alert indication for the person carrying that PEMD 100 and to any personnel that may be nearby so as to provide assistance to the personnel presumably down, and optionally to any other PEMDS 100 that may be nearby as determined from the locating data that has been reported and tracked for each PEMD 100. If the no-movement time is less 620—N than the predetermined threshold, then 620—N process 600 proceeds directly to step 630.

It is intended that the personnel down feature (sometimes referred to as a "man-down" feature) may be provided wholly within PEMD 100, e.g., by the processor 150 and user interface 120, 130 thereof, so that at least a local alert and warning is provided even when communication via relay devices 250, 250A may be unavailable, as well as being provided by the operation of system 10 via one or more of relay devices 250, 250A, command centers 228, 246 and central facility 310.

Sensor data, e.g., from other sensors 166, 166W, 168 is retrieved 630 from the relational database and each item of data is tested 635 against normal and/or acceptable predetermined threshold levels or limits, e.g., based upon predetermined safety and/or exposure standards, for whether or not it is out of bounds 635. If the sensor data is within the predetermined limits, then path 635—N takes process 600 directly to step 650. If the sensor data is not within the predetermined levels, i.e. is out of limits, then 635—Y path is followed to generate 640 a notification to the PEMD 100 of headgear 10 of that personnel or if the condition is such as to threaten some or all personnel, notification is sent 640 to the PEMDS 100 of the some or all personnel. Notification 640 to personnel can take the form of a cease operation, take prescribed action, seek shelter, evacuate, and the like. A like notification is generated 645 for management for their oversight, ordering an appropriate response, and/or providing further notifications outside of the site.

Location permissions, e.g., the GPS coordinates and times designating the areas that a particular personnel is assigned and/or permitted to be in and designating the areas and times for areas for which that personnel is not to be in are retrieved 650 from the relational data base, again using the unique identifier of that personnel's PEMD 100 and/or personnel ID badge 400. Areas that may be off limits may include, e.g., those too dangerous for human presence, those where particular personnel are not trained or equipped to enter, or for which particular personnel lack proper security clearance to enter.

The retrieved 650 location data for that personnel reported by his PEMD 100 is compared 655 with (or tested 650 against) the permissions retrieved 650 from the database. If the personnel is where he is permitted to be, e.g., in bounds or not out of bounds, then path 655—N takes process 600 directly to step 670. If the personnel is where he is not permitted to be, e.g., is out of bounds, then path 655—Y leads to generating 660 notifications to management so that appropriate investigation and/or action can be initiated, and generating 665 a notification to the PEMD 100 of the gear 10 of that personnel so that the personnel can move promptly out of a prohibited area and into a permitted location.

It is noted that presence in an area causing an out of bounds result 655—Y may only be an error, but it could also be an indication that a security or other serious action is being attempted, which the notification thereof serves to advise management and/or security personnel that investigation may be advisable.

Further, the comparing 655 of personnel location and personnel location permissions may be utilized for granting and/or denying access to certain areas and/or equipment to which access is controlled, e.g., for providing access control based upon the unique identifier of PEMD 100 and/or the unique badge identifier of badge 400. While personnel location permissions may be stored in a central database, e.g., a database 360 at a monitoring station 310 and/or at a command center 228, 246, and access control may be performed by communication with that central database via transmitter-receiver 170, access control may be otherwise provided. For example, an access control device may be provided proximate the gate, area and/or equipment to which access is to be controlled wherein the access control device has some or all of the personnel location permissions stored therein and has a receiver and transmitter for communicating with PEMD 100 and/or personnel badge 400, e.g., via transmitter-receiver 170 and/or 470 thereof.

Then, preferably after the data is received and comparisons made, the relational database 360 is updated 670 to store records of the results of comparisons 615, 620, 635, 655, and/or of all notifications generated 625, 640, 645, 660, 665. The stored 670 updated records may include all or some of the results, e.g., only the out of limits comparisons and notifications generated in response thereto, as may be appropriate and desirable in any given circumstance. The updated 670 database records may be accumulated for generating 675 reports for site and/or overall management, for security, for environmental monitoring, for safety monitoring, for compliance monitoring, and/or for other monitoring and management purposes.

Where exposure time to a particular danger or hazard is important, the reports generated 675 can include cumulative exposure time based upon the location data to indicate proximity to the danger or hazard as derived from location data and time data, e.g., date-time stamps, thereof stored in the records of the relational database combined with detected levels of exposure as represented in the sensor data for that particular hazard transmitted from PEMD 100 and stored in the relational database, all related to each other by the unique identifier of a PEMD 100 and/or the unique badge identifier of a personnel ID badge 400.

Activation of a Help-on-Demand 140 or panic button 140 of a PEMD 100 causes device 100 to communicate an out of limits condition to the monitoring station which could be a separately defined transmission code or a combination of out of limits conditions that the relational database detects as a call for help or assistance. By way of example, such transmission could be received 680 from PEMD 100 and immediately initiate notifications 660 to management and notifications 665 to PEMD 100 devices in close proximity, e.g., as determined from the most recent location data received 605 from that particular PEMD 100, and all related by the unique identifier of that particular PEMD 100. The result is that any available help and/or assistance, whether from nearby personnel identified by their location data or from command center and/or monitoring station and/or other centralized or specialized resources, e.g., security and/or rescue staff personnel, may be quickly dispatched.

The notifications responsive to the panic button activation are preferably augmented by data visually and/or audibly presented on the user interfaces 120, 130 of PEMD 100 devices to the PEMD 100 whose panic button 140 was activated, as determined, e.g., from the location data thereof. Date-time stamps and other data relating to the panic button activation, to the notifications, to the response commands and actions, and of location and other data of the PEMDS 100 of other personnel will be available for analysis of the emergent condition and of the response thereto, all by records in the database that are relatable using the unique identifiers and/or location data and/or other data from any number of PEMDS 100.

PEMD 100 may be based on or comprise a smart phone or other electronic device 100 that includes the necessary functional elements, e.g., a locating device 162, a wireless communication device 170, e.g., for local (e.g., Bluetooth) and remote (e.g., cellular) communication, a user interface 120, 130, a motion sensor 164, a processor 150 and a memory 152. The locating device 162 and motion sensor 164 may be separate devices or may be a single device where such device is available, preferably consistent with both externally referenced locating, e.g., using GPS, RSSI, ranging and/or triangulation, as well as internally referenced locating, e.g., gyroscopic or other dead reckoning Such dead reckoning may be used to improve the accuracy of GPS or other locating method, or may be used when an external locating capability is lost. While the accuracy of dead reckoning tends to decrease with distance, unacceptable levels of accumulated error may be avoided because relay devices 250, 250A are preferably deployed relatively close together, e.g., within about 20-40 feet.

A source of electrical power 112 for PEMD 100, as well as those for relay devices 250, 250A, biological monitor 166W and imager 168, may include a battery, a rechargeable battery or another source of electrical power, however, such power source should have sufficient capacity to operate PEMD 100 and the other devices for at least eight hours and preferably for 24 hours or longer.

Preferably, the data received for locating, tracking, monitoring personnel and conditions on site that is communicated to command centers 228 and/or 246 and central facility 310 should be accessible via the Internet or other shared communication path, particularly where plural response teams, e.g., plural fire truck units and/or fire houses and/or police, are involved at a common site or structure 200 so that their respective operations can be jointly tracked, monitored and coordinated. Certain PEMDS 100, e.g., those for chiefs, commanders and other operations planners and coordinators, may have an enlarged visual interface 120 or may have an enlarged visual interface accessory 120, and that interface 120 is configured to display the same or a selection of information as may be displayed at a command center 228, 246 or central facility 310.

All of devices 100, 166W, 168, 250A and the like may be housed in insulated containers and/or have fire and heat blocking cases to improve and maintain their operation and function in a fire and heat environment. Fire retardant fiberglass foams and other insulation that does not burn and that does not interfere with wireless radio frequency (RF) communication may be employed on the exterior and/or interior thereof. Longer range communications, e.g., via WiFi routers, relays and networks, and via cellular networks are preferred as primary and/or back up communication paths.

While smart phones are an available electronic device that can be or provide a basic PEMD 100, specialized wireless device may be employed as well. For example, Cat-S50 and S-60 devices available from Caterpillar Incorporated of Peoria, Ill., is intended for construction and military usage and supports 4G LTE data communication and has a 2350 milliampere-hour battery, and the Sonim XP6/XP7 devices available from Sonim Technologies, Inc. of San Mateo, Calif., have a 4800 milliampere-hour battery and operate on both 700 MHz and commercial band LTE frequencies. Biological monitor 166W may be or may be based upon a standard wrist monitor such as those available from Fitbit of San Francisco, Calif., and the Samsung Gear Live device available from Samsung Corp. of Korea. All should operate for at least 12 hours and preferably for 24 hours and if available, be intrinsically safe.

PEMD 100, bio-monitor 166W and/or imaging device 168 are preferably made of materials that can withstand the extremes of temperature, high heat, fire, flame, corrosive gas and the like to which they may be expected to be exposed, and/or may be encased in materials or enclosed in housings that withstand such environments.

A personnel tracking and monitoring system may comprise: a plurality of sets of monitoring devices 100, 166W, 168 configured to be carried by personnel, each set of monitoring devices 100, 166W, 168 may include: an electronic device 100 having a unique identifier and including a locating device 162 configured to provide location data, a wireless communication device configured for communicating via a plurality of communication protocols, and a user interface configured to provide information to a user in human perceivable form and to receive information from a user wherein the wireless communication device is configured to communicate information provided to and received by the user interface; an imaging device 168 configured to provide image data and including a wireless transmitter for communicating the image data to the wireless communication device of the electronic device 100 via a first relatively short range communication protocol thereof; and a biologic monitor 166W device configured to provide biologic data of a personnel when carried by that personnel and including a wireless transmitter for communicating the biologic data to the wireless communication device of the electronic device 100 via the first or a second relatively short range communication protocol thereof; the electronic device 100 including a processor configured to associate the unique identifier, the location data and time data with received image data and with received biologic data and to cause the wireless communication device to transmit the received image data and biologic data and the unique identifier, the location data and the time data associated therewith via the first or second relatively short range communication protocol thereof or via a relatively longer range communication protocol thereof; and a plurality of portable relay devices 250, 250A configured for being deployed at a site, each the portable relay device 250, 250A having a wireless communication device configured to communicate with the wireless communication devices of the plurality of sets of monitoring devices 100, 166W, 168 to relay the received image data and biologic data and the unique identifier, the location data and the time data associated therewith to one or more monitoring stations 228, 246, 290 either directly or via one or more of the plurality of portable relay devices 250, 250A; each monitoring station 228, 246, 290 may include a communication device configured to communicate directly or indirectly with the wireless communication devices of the plurality of portable relay devices 250, 250A to receive the image data and biologic data and the unique identifier, the location data and the time data associated therewith relayed thereby, and a database for storing the received image data and biologic data and the unique identifier, the location data and the time data associated therewith, and at least one monitoring station 228, 246, 290 may include a processor configured to compare data stored in the data base with one or more predetermined criteria and when one or more of the predetermined criteria is exceeded, to generate an indication thereof and to communicate the indication to each monitoring station 228, 246, 290, to the electronic device 100 to which such indication relates, or to each monitoring station 228, 246, 290 and to the electronic device 100 to which such indication relates. The locating device 162 may include: a global positioning system receiver; or a global positioning system receiver including wide area augmentation. The system may further comprise at least one accelerometer and/or gyroscopic device and/or a received signal strength indication device configured to provide motion data and to provide location data relative to a location determined by the global positioning system receiver, whereby location data is provided when GPS signal to the global positioning system receiver is lost. The electronic device 100 may include a motion sensor 160, 164 configured to provide motion data that is representative of whether a person wearing the electronic device 100 is animated or is substantially motionless. A notification may be generated when the motion data represents that the person wearing the electronic device 100 is substantially motionless for more than a predetermined period of time. A notification may be: generated by the processor of the electronic device 100 and is transmitted by the wireless communication device thereof when the motion data represents that the person wearing the electronic device 100 is substantially motionless for more than a predetermined period of time; or generated by the processor of the monitoring station 228, 246, 290 and is transmitted by the wireless communication device thereof when the motion data exceeds a predetermined criteria representing being substantially motionless for more than a predetermined period of time. The motion sensor 160, 164 may include at least one accelerometer or an inertial device or both. The wireless communication devices of the electronic devices 100 and of the relay devices 250, 250A may communicate using an IEEE 802.1 network, an IEEE 802.15 network, a Bluetooth network, a Wi-Fi network, a ZigBee network, an EmberNet ad hoc network, 3G and/or 4G LTE data frequencies, 433 MHz and/or 700 MHz frequencies, commercial band LTE frequencies, RFID communication, microwave and/or fiberoptic links, a cellular network, and/or a satellite network. The electronic device 100 may further comprise one or more sensors 160 that monitor health-indicating characteristics of personnel, ambient conditions, hazardous substances, hazardous conditions, and/or the environment. The one or more sensors 160 may include sensors of environmental conditions, temperature, pressure, position, acceleration, impact, distance, gyroscopic and/or inertial information, magnetic field, electrical continuity, altitude, a physical parameter, moisture, humidity, chemicals, gases, medical parameters, biological substances and/or agents, radioactivity, optical, light, infrared, images, still and/or video images, sound, noise, electromagnetic fields, and any combination of any two or more thereof. The imaging device 168 may include a still imager or a video imager or both; or the biologic monitor 166W may sense calories expended, steps taken, stair steps climbed, stair steps descended, time, distance, body temperature, heart rate, respiration, or any combination thereof; or the imaging device 168 may include a still imager or a video imager or both, and the biologic monitor 166W may sense calories expended, steps taken, stair steps climbed, stair steps descended, time, distance, body temperature, heart rate, respiration, or any combination thereof. The user interface 120, 130 may comprise: a sound transducer 130 which may include any one or more of a buzzer, beeper, annunciator, loudspeaker, earphone, an audibly perceptible device, a microphone, a sound pick up device, or any combination thereof; or a visual transducer 120 which may include any one or more of a light, a flashing light, a light producing different colors, a LED, a LCD display, a visually perceptible device, a display screen, an imaging device 168 to capture still and/or video images, or a combination thereof; or both a sound transducer 130 and a visual transducer 120. The user interface 120, 130 may include any one or more of an annunciator, loudspeaker, earphone, or an audibly perceptible device, and includes a microphone, or a sound pick up device, coupled to the transmitter-receiver for providing two-way voice communication. The electronic device 100, the imaging device 168 and the biologic monitor 166W may be made of a material, may be encased in a material and/or may be enclosed in a housing that withstands the extremes of temperature, high heat, fire, flame, and corrosive gas to which they may be exposed. Records describing a site and/or communication facilities at the site may be received whilst en route to a site and deployment of the portable relay devices 250, 250A may be planned based upon the received site records, wherein the portable relay devices 250, 250A are configured based upon the deployment plan and are deployed at the site in accordance with the deployment plan. Records describing a site and/or communication facilities at the site may be received whilst en route to a site and deployment of the portable relay devices 250, 250A at specific locations at the site may be planned based upon the received site records, wherein the portable relay devices 250, 250A are configured based upon the deployment plan including defining for each portable relay device 250, 250A the specific location at which that portable relay device 250, 250A is to be deployed, and wherein each portable relay device 250, 250A is deployed at the specific location at the site defined therefor in accordance with the deployment plan, whereby each portable relay device 250, 250A has a specific location defined therein and is deployed substantially at that specific defined location so that location with respect to each deployed portable relay device 250, 250A can be defined without reference to an external locating signal. The defined specific locations may include entrances, exits, stairways, elevators, and or spaces that are at known predetermined locations at the site. Records describing the site and/or communication facilities at the site may be received whilst en route to a site; deployment of personnel and of the portable relay devices 250, 250A may be planned based upon the received site records; the electronic devices 100, the portable relay devices 250, 250A or both the electronic devices 100 and the portable relay devices 250, 250A may be configured based upon the received site records, the deployment plan or both; and personnel and the portable relay devices 250, 250A may be deployed in accordance with the deployment plan.

A method for tracking and monitoring personnel may comprise: providing a plurality of sets of monitoring devices 100, 166W, 168 configured to be carried by personnel, each set of monitoring devices 100, 166W, 168 including: an electronic device 100 having a unique identifier and including a locating device 162 configured to provide location data, a wireless communication device configured for communicating via a plurality of communication protocols, and a user interface configured to provide information to a user in human perceivable form and to receive information from a user wherein the wireless communication device is configured to communicate information provided to and received by the user interface; an imaging device 168 configured to provide image data and including a wireless transmitter for communicating the image data to the wireless communication device of the electronic device 100 via a first relatively short range communication protocol thereof; and a biologic monitor 166W device configured to provide biologic data of a personnel when carried by that personnel and including a wireless transmitter for communicating the biologic data to the wireless communication device of the electronic device 100 via the first or a second relatively short range communication protocol thereof; associating the unique identifier, the location data and time data with received image data and with received biologic data; transmitting the received image data and biologic data and the unique identifier, the location data and the time data associated therewith via the first or second relatively short range communication protocol or via a relatively longer range communication protocol; deploying a plurality of portable relay devices 250, 250A at a site, each portable relay device 250, 250A having a wireless communication device configured to communicate with the wireless communication devices of the plurality of sets of monitoring devices 100, 166W, 168; relaying the received image data and biologic data and the unique identifier, the location data and the time data associated therewith to one or more monitoring stations 228, 246, 290 either directly or via one or more of the plurality of portable relay devices 250, 250A; communicating directly or indirectly with the wireless communication devices of the plurality of portable relay devices 250, 250A to receive the image data and biologic data and the unique identifier, the location data and the time data associated therewith relayed thereby, storing the received image data and biologic data and the unique identifier, the location data and the time data associated therewith in a database; comparing data stored in the data base with one or more predetermined criteria and when one or more of the predetermined criteria is exceeded, generating an indication thereof and communicating the indication to each monitoring station 228, 246, 290, to the electronic device 100 to which such indication relates, or to each monitoring station 228, 246, 290 and to the electronic device 100 to which such indication relates. The locating device 162 may include: a global positioning system receiver; or a global positioning system receiver including wide area augmentation. The method may further comprise: receiving motion data from at least one accelerometer and/or gyroscopic device and/or a received signal strength indication device of the electronic device 100; and processing the motion data to provide location data relative to a location determined by the locating device 162, whereby location data is provided when external signal to the locating device 162 is lost. The method may further comprise: receiving motion data from a motion sensor 160, 164 of the electronic device 100; and processing the motion data to determine whether a person wearing the electronic device 100 is animated or is substantially motionless. The method may further include generating a notification when the motion data represents that the person wearing the electronic device 100 is substantially motionless for more than a predetermined period of time. Generating a notification may include: generating the notification in the electronic device 100 and transmitting the notification via the wireless communication device thereof when the motion data represents that the person wearing the electronic device 100 is substantially motionless for more than the predetermined period of time; or generated the notification at a monitoring station 228, 246, 290 and transmitting the notification via the wireless communication device thereof when the motion data exceeds a predetermined criteria representing being substantially motionless for more than the predetermined period of time. The motion sensor 160, 164 may include at least one accelerometer or an inertial device or both. Transmitting the received image data and biologic data and the unique identifier, the location data and the time data associated therewith by the electronic devices 100 and the relaying thereof may employ an IEEE 802.1 network, an IEEE 802.15 network, a Bluetooth network, a Wi-Fi network, a ZigBee network, an EmberNet ad hoc network, 3G and/or 4G LTE data frequencies, 433 MHz and/or 700 MHz frequencies, commercial band LTE frequencies, RFID communication, microwave and/or fiberoptic links, a cellular network, and/or a satellite network. The method may further include monitoring health-indicating characteristics of personnel, ambient conditions, hazardous substances, hazardous conditions, and/or the environment by one or more sensors of the electronic device 100. The one or more sensors 160 may include sensors of environmental conditions, temperature, pressure, position, acceleration, impact, distance, gyroscopic and/or inertial information, magnetic field, electrical continuity, altitude, a physical parameter, moisture, humidity, chemicals, gases, medical parameters, biological substances and/or agents, radioactivity, optical, light, infrared, images, still and/or video images, sound, noise, electromagnetic fields, and any combination of any two or more thereof. The imaging data may include still images or video images or both; or the biologic data may include calories expended, steps taken, stair steps climbed, stair steps descended, time, distance, body temperature, heart rate, respiration, or any combination thereof; or the imaging data may include still images or video images or both, and the biologic data may include calories expended, steps taken, stair steps climbed, stair steps descended, time, distance, body temperature, heart rate, respiration, or any combination thereof. The electronic device 100 may include a user interface 120, 130 and the method may further comprise: providing information audibly via any one or more of a buzzer, beeper, annunciator, loudspeaker, earphone, an audibly perceptible device, a microphone, a sound pick up device, or any combination thereof; or providing information visually via any one or more of a light, a flashing light, a light producing different colors, a LED, a LCD display, a visually perceptible device, a display screen, an imaging device 168 to capture still and/or video images, or a combination thereof; or providing information both audibly and visually. The method may further include enclosing and/or encasing the electronic device 100, the imaging device 168 and/or the biologic monitor 166W in a material and/or in a housing that withstands the extremes of temperature, high heat, fire, flame, and/or corrosive gas to which the electronic device 100 may be exposed. The method may further comprise: receiving whilst en route to a site records describing the site and/or communication facilities at the site; planning deployment of the portable relay devices 250, 250A based upon the received site records; configuring the portable relay devices 250, 250A based upon the deployment plan; and deploying the portable relay devices 250, 250A at the site in accordance with the deployment plan. The method may further comprise: receiving whilst en route to a site records describing the configuration of the site; planning deployment of the portable relay devices 250, 250A at specific locations at the site based upon the received site records; configuring the portable relay devices 250, 250A based upon the deployment plan including defining for each portable relay device the specific location at which that portable relay device is to be deployed; and deploying the portable relay devices 250, 250A at the specific locations at the site in accordance with the deployment plan, whereby each portable relay device 250, 250A has a specific location defined therein and is deployed substantially at that specific defined location so that location with respect to each deployed portable relay device 250, 250A can be defined without reference to an external locating signal. The defined specific locations may include entrances, exits, stairways, elevators, and or spaces that are at known predetermined locations at the site. The method may further comprise: receiving whilst en route to a site records describing the site and/or communication facilities at the site; planning deployment of personnel and of the portable relay devices 250, 250A based upon the received site records; configuring the electronic devices 100, the portable relay devices 250, 250A or both the electronic devices 100 and the portable relay devices 250, 250A based upon the received site records, the deployment plan or both; and deploying personnel and the portable relay devices 250, 250A in accordance with the deployment plan.

A personnel tracking and monitoring system 10 may comprise: a plurality of sets of monitoring devices 100 configured to be carried by personnel, each set of monitoring devices 100 including: an electronic device 100 having a unique identifier and including a locating devices 162 configured to provide location data, a wireless communication device configured for communicating via a plurality of communication protocols, and a user interface 120, 130 configured to provide information to a user in human perceivable form and to receive information from a user; the electronic device 100 including a processor configured to associate the unique identifier, the location data and time data and to cause the wireless communication device to transmit the unique identifier, the location data and the time data associated therewith, wherein the wireless communication device is configured to communicate the unique identifier, the location data and the time data associated therewith, and information provided to and received by the user interface 120, 130, via a short range communication protocol thereof and/or via a longer range communication protocol thereof; a plurality of portable relay devices 250, 250A configured for being deployed at a site, each portable relay device 250, 250A having a wireless communication device configured to communicate with the wireless communication devices of the plurality of sets of monitoring devices 100 to relay the unique identifier, the location data and the time data associated therewith, and information provided to and/or received by the user interface 120, 130, to one or more monitoring stations 228, 246, 290 either directly or via one or more of the plurality of portable relay devices 250, 250A; wherein records describing the site and/or communication facilities at the site are received prior to arrival at the site and deployment of the portable relay devices 250, 250A at specific locations at the site is planned based upon the received site records, wherein the portable relay devices 250, 250A are configured based upon the deployment plan including defining for each portable relay device 250, 250A the specific location at which that portable relay device 250, 250A is to be deployed, and wherein each portable relay device 250, 250A is deployed at the specific location at the site defined therefor in accordance with the deployment plan, whereby each portable relay device 250, 250A has a specific location defined therein and is deployed substantially at that specific defined location so that location at the site can be defined with respect to each deployed portable relay device 250, 250A without reference to an external locating signal; and at least one monitoring station including a communication device configured to communicate directly with the plurality of electronic devices 100 and/or indirectly therewith via the wireless communication devices of the plurality of portable relay devices 250, 250A to receive the unique identifier, the location data and the time data associated therewith, and the information provided to and/or received by the user interface 120, 130, the at least one monitoring station further including a database for storing the received the unique identifier, the location data and the time data associated therewith, and information provided to and/or received by the user interface 120, 130, the at least one monitoring station further including a processor configured to compare data stored in the data base with one or more predetermined criteria and when one or more of the predetermined criteria is exceeded, to generate an indication thereof and to communicate the indication to the electronic device 100 to which such indication relates, and when there is one or more additional monitoring stations 228, 246, 290, then to each additional monitoring station. Each set of monitoring devices 100 may further include either: an imaging device configured to provide image data and including a wireless transmitter for communicating the image data to the wireless communication device of the electronic device 100 via a first short range communication protocol thereof or a biologic monitor device configured to provide biologic data of a personnel when carried by that personnel and including a wireless transmitter for communicating the biologic data to the wireless communication device of the electronic device 100 via the first or a second short range communication protocol thereof; and wherein: the processor of the at least one monitoring station is configured to compare either image data from the imaging device when the imaging device is included or to compare biologic data from the biologic monitor device when the biologic monitor device is included and data stored in the data base with the one or more predetermined criteria and when the one or more of the predetermined criteria is exceeded, to generate an indication thereof. The locating devices 162 may include: a global positioning system receiver; or a global positioning system receiver including wide area augmentation. The system 10 may further comprise at least one accelerometer and/or gyroscopic device and/or a received signal strength indication device configured to provide motion data and to provide location data relative to a location determined by the global positioning system receiver and/or by one or more of the portable relay devices 250, 250A, whereby the location data relative to a location determined by the global positioning system receiver and/or by one or more of the portable relay devices 250, 250A is provided when GPS signal to the global positioning system receiver is lost. The electronic device 100 may include a motion sensor 160, 164 configured to provide motion data that is representative of whether a person wearing the electronic device 100 is animated or is substantially motionless, and wherein a notification is generated when the motion data represents that the person wearing the electronic device 100 is substantially motionless for more than a predetermined period of time. The notification may be: generated by the processor of the electronic device 100 and is transmitted by the wireless communication device of the electronic device 100 when the motion data represents that the person wearing the electronic device 100 is substantially motionless for more than the predetermined period of time; or generated by the processor of the monitoring station and is transmitted by the communication device of the monitoring station when the motion data exceeds the predetermined criteria representing being substantially motionless for more than the predetermined period of time. The motion sensor 160, 164 may include at least one accelerometer or an inertial device or both. The electronic device 100 may further comprise one or more sensors that monitor health-indicating characteristics of personnel, ambient conditions, hazardous substances, hazardous conditions, and/or the environment, and wherein the one or more sensors include sensors of environmental conditions, temperature, pressure, position, acceleration, impact, distance, gyroscopic and/or inertial information, magnetic field, electrical continuity, altitude, a physical parameter, moisture, humidity, chemicals, gases, medical parameters, biological substances and/or agents, radioactivity, optical, light, infrared, images, still and/or video images, sound, noise, electromagnetic fields, and any combination of any two or more thereof. The imaging device 168 may include a still imager or a video imager or both; or the biologic monitor 166W, may sense calories expended, steps taken, stair steps climbed, stair steps descended, time, distance, body temperature, heart rate, respiration, or any combination thereof; or the imaging device may include a still imager or a video imager or both, and the biologic monitor may sense calories expended, steps taken, stair steps climbed, stair steps descended, time, distance, body temperature, heart rate, respiration, or any combination thereof. The user interface 120, 130 may comprise: a sound transducer 130 including any one or more of a buzzer, beeper, annunciator, loudspeaker, earphone, an audibly perceptible device, a microphone, a sound pick up device, or any combination thereof; and/or a visual transducer 120 including any one or more of a light, a flashing light, a light producing different colors, a LED, a LCD display, a visually perceptible device, a display screen, an imaging device to capture still and/or video images, or a combination thereof. The records describing the site and/or the communication facilities at the site may be received whilst en route to the site; or the records describing the site and/or the communication facilities at the site may be received whilst en route to the site and deployment of the portable relay devices 250, 250A may be planned based upon the received site records, wherein the portable relay devices 250, 250A may be configured based upon the deployment plan and may be deployed at the site in accordance with the deployment plan; or the records describing the site and/or the communication facilities at the site may be received whilst en route to the site, deployment of personnel and of the portable relay devices 250, 250A may be planned based upon the received site records, the electronic devices 100, the portable relay devices 250, 250A or both the electronic devices 100 and the portable relay devices 250, 250A may be configured based upon the received site records, the deployment plan or both, and personnel and the portable relay devices 250, 250A may be deployed in accordance with the deployment plan. The defined specific locations may include entrances, exits, stairways, elevators, and/or spaces that are at known predetermined locations at the site.

A method for tracking and monitoring personnel may comprise: providing a plurality of sets of monitoring devices 100 configured to be carried by personnel, each set of monitoring devices 100 including: an electronic device 100 having a unique identifier and including a locating devices 162 configured to provide location data, a wireless communication device configured for communicating via a plurality of communication protocols, and a user interface 120, 130 configured to provide information to a user in human perceivable form and to receive information from a user wherein the wireless communication device is configured to communicate information provided to and received by the user interface 120, 130; associating the unique identifier, the location data and time data; transmitting the unique identifier, the location data and the time data associated therewith via the first or second short range communication protocol or via a longer range communication protocol; deploying a plurality of portable relay devices 250, 250A at a site, each portable relay device 250, 250A having a wireless communication device configured to communicate with the wireless communication devices of the plurality of sets of monitoring devices 100; receiving prior to arrival at the site records describing the configuration of the site; planning deployment of the portable relay devices 250, 250A at specific locations at the site based upon the received site records; configuring the portable relay devices 250, 250A based upon the deployment plan including defining for each portable relay device 250, 250A the specific location at which that portable relay device 250, 250A is to be deployed; and deploying the portable relay devices 250, 250A at the specific locations at the site in accordance with the deployment plan, whereby each portable relay device 250, 250A has a specific location defined therein and is deployed substantially at that specific defined location so that location with respect to each deployed portable relay device 250, 250A can be defined without reference to an external locating signal; relaying the unique identifier, the location data and the time data associated therewith to one or more monitoring stations 228, 246, 290 either directly or via one or more of the plurality of portable relay devices 250, 250A; communicating directly or indirectly with the wireless communication devices of the plurality of portable relay devices 250, 250A to receive the unique identifier, the location data and the time data associated therewith relayed thereby, storing the received unique identifier, the location data and the time data associated therewith in a database; comparing data stored in the data base with one or more predetermined criteria and when one or more of the predetermined criteria is exceeded, generating an indication thereof and communicating the indication to each monitoring station, to the electronic device 100 to which such indication relates, or to each monitoring station and to the electronic device 100 to which such indication relates. The method may further comprise: associating the unique identifier, the location data and time data with image data received from an imaging device and with biologic data received from a biologic monitor device; communicating the image data and biologic data and storing the image data and biologic data in the data base; and comparing the image data and biologic data stored in the data base with one or more predetermined criteria and when one or more of the predetermined criteria is exceeded, generating an indication thereof and communicating the indication to each monitoring station, to the electronic device 100 to which such indication relates, or to each monitoring station and to the electronic device 100 to which such indication relates. The image data may include still images or video images or both; or the biologic data may include calories expended, steps taken, stair steps climbed, stair steps descended, time, distance, body temperature, heart rate, respiration, or any combination thereof; or the image data may include still images or video images or both, and the biologic data may include calories expended, steps taken, stair steps climbed, stair steps descended, time, distance, body temperature, heart rate, respiration, or any combination thereof. The method may further comprise: receiving motion data from at least one accelerometer and/or gyroscopic device and/or a received signal strength indication device of the electronic device 100; and processing the motion data to provide location data relative to a location determined by the locating devices 162 and/or by one or more of the portable relay devices 250, 250A, whereby the location data relative to a location determined by the locating devices 162 and/or by one or more of the portable relay devices 250, 250A is provided when external signal to the locating devices 162 is lost. The method of claim 13 may further comprise: receiving motion data from a motion sensor 160, 164 of the electronic device 100; and processing the motion data to determine whether a person wearing the electronic device 100 is animated or is substantially motionless. The method may further include generating a notification when the motion data represents that the person wearing the electronic device 100 is substantially motionless for more than a predetermined period of time. The method may further include generating a notification, wherein the generating the notification may include: generating the notification in the electronic device 100 and transmitting the notification via the wireless communication device of the electronic device 100 when the motion data represents that the person wearing the electronic device 100 is substantially motionless for more than the predetermined period of time; or generating the notification at a monitoring station and transmitting the notification via the communication device of the monitoring station when the motion data exceeds a predetermined criteria representing being substantially motionless for more than the predetermined period of time. The motion sensor 160, 164 may include at least one accelerometer or an inertial device or both. The method may further include monitoring health-indicating characteristics of personnel, ambient conditions, hazardous substances, hazardous conditions, and/or the environment by one or more sensors of the electronic device 100, wherein the one or more sensors include sensors of environmental conditions, temperature, pressure, position, acceleration, impact, distance, gyroscopic and/or inertial information, magnetic field, electrical continuity, altitude, a physical parameter, moisture, humidity, chemicals, gases, medical parameters, biological substances and/or agents, radioactivity, optical, light, infrared, images, still and/or video images, sound, noise, electromagnetic fields, and any combination of any two or more thereof. The user interface 120, 130: may provide information audibly including via any one or more of a buzzer, beeper, annunciator, loudspeaker, earphone, an audibly perceptible device, a microphone, a sound pick up device, or any combination thereof; or may provide information visually including via any one or more of a light, a flashing light, a light producing different colors, a LED, a LCD display, a visually perceptible device, a display screen, an imaging device to capture still and/or video images, or a combination thereof; or may provide information both audibly and visually. The receiving prior to arrival at the site, the planning deployment, and the configuring the portable relay devices 250, 250A may further comprise: receiving whilst en route to the site the records describing the site and/or communication facilities at the site; planning deployment of the portable relay devices 250, 250A and/or personnel whilst en route to the site based upon the received records describing the site and/or communication facilities; and configuring the electronic devices 100, the portable relay devices 250, 250A or both the electronic devices 100 and the portable relay devices 250, 250A whilst en route to the site based upon the deployment plan. The defined specific locations may include entrances, exits, stairways, elevators, and/or spaces that are at known predetermined locations at the site.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "up," "down," "left," "right," "up," "down," "front," "rear," "side," "end," "top," "bottom," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B." In addition, the term "at least one of" one or more elements is intended to include one of any one of the elements, more than one of any of the elements, and two or more of the elements up to and including all of the elements, and so, e.g., the phrase in the form "at least one of A, B and C" includes "A," "B," "C," "A and B," "A and C," "B and C," and "A and B and C."

A fastener as used herein may include any fastener or other fastening device that may be suitable for the described use, including threaded fasteners, e.g., bolts, screws and driven fasteners, as well as pins, rivets, nails, spikes, barbed fasteners, clips, clamps, nuts, speed nuts, cap nuts, acorn nuts, and the like. Where it is apparent that a fastener would be removable in the usual use of the example embodiment described herein, then removable fasteners would be preferred in such instances. A fastener may also include, where appropriate, other forms of fastening such as a formed head, e.g., a peened or heat formed head, a weld, e.g., a heat weld or ultrasonic weld, a braze, and adhesive, and the like.

While various operations, steps and/or elements of a process or method or operation may be described in an order or sequence, the operations, steps and/or elements do not need to be performed in that order or sequence, or in any particular order or sequence, unless expressly stated to require a particular order or sequence.

As used herein, the terms "connected" and "coupled" as well as variations thereof are not intended to be exact synonyms, but to encompass some similar things and some different things. The term "connected" may be used generally to refer to elements that have a direct electrical and/or physical contact to each other, whereas the term "coupled" may be used generally to refer to elements that have an indirect electrical and/or physical contact with each other, e.g., via one or more intermediate elements, so as to cooperate and/or interact with each other, and may include elements in direct contact as well.

It is noted that various data, sensor values and alarm values may represent actual physical conditions of different places and/or different equipment and/or different parts of an installation, equipment and/or other place, e.g., generally local conditions, that may be transformed by the system and method described herein to provide a representation of the overall state and/or condition of the installation, equipment and/or place, e.g. a representation of the complete installation, equipment and/or place. That representation may be transformative of a representation of a nominal overall state and/or condition thereof, e.g., in a prior or different condition and/or time, to a representation of an actual overall state and/or condition thereof, e.g., in a present or more recent or otherwise different condition and/or time. Further, the system and method may generate tasks and commands that are executed to transform the installation, equipment and/or place into a different configuration, i.e. into a different installation, equipment and/or place, and a representation of that different configuration is provided or displayed, e.g., to human operators. The system described herein may include one or more general purpose and/or special purpose computers, or microprocessors or other processors, and the method described herein may be performed in part by one or more general purpose and/or special purpose computers, or microprocessors or other processors.

As used herein, image and/or information are used interchangeably with respect to what is captured by an imaging device and/or is displayed on a display device, and are intended to encompass any and all of the wide variety of devices that a user may desire, including, but not limited to, visual images and pictures, whether still or moving, whether captured and/or generated by a camera, computer or any other source, whether true, representative or abstract or arbitrary, whether or not including symbols or characters such as alphanumeric characters or mathematical notations, whether captured and/or displayed in black and white, monochrome, polychrome or full color.

While the present invention has been described in terms of the foregoing example embodiments, variations within the scope and spirit of the present invention as defined by the claims following will be apparent to those skilled in the art. For example, PEMD 100 can be mounted inside of protective headgear 10 or under protective clothing or equipment, at least where shell 12 thereof and the protective clothing and equipment is not electrically conductive which could adversely affect wireless communication.

While Help-on-Demand or panic button 240 is illustrated as being part of PEMD 100, it may be provided as a separate piece to be mounted at a suitable and convenient location on a using personnel, e.g., on equipment or on a belt or on a headgear shell 12, e.g., by a hook and loop fastener or by a pressure sensitive or other adhesive, and be coupled to PEMD 100 via wires or preferably by a wireless link, e.g., a Bluetooth link.

While any single suitable communication link between PEMD 100 and auxiliary devices 166W, 168, and or between PEMDS 100 and communication relays 250, 250A, and between communication relays 250, 250A and a central or other monitoring facility 228, 246, 290, may be sufficient, redundant communication links, e.g., WiFi and an RF link, e.g., at 433 MHz or another frequency, may be employed, and in certain environments may be desirable.

Protective gear 10 may include a firefighter helmet, police helmet, hard hat, helmet, enclosed helmet, part of a protective suit, e.g., a biological-hazard, radiation-hazard, or chemical-hazard suit, or other protective clothing and/or covering, or any other headgear or other equipment or gear with which a personnel electronic monitor device (PEMD) is or may be used.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A personnel tracking and monitoring system comprising:
   a plurality of sets of monitoring devices configured to be carried by personnel, each set of monitoring devices including:
      an electronic device having a unique identifier and including a locating device configured to provide location data, a wireless communication device configured for communicating via a plurality of communication protocols, and a user interface configured to provide information to a user in human perceivable form and to receive information from a user;
      said electronic device including a processor configured to associate the unique identifier, the location data and time data and to cause the wireless communication device to transmit the unique identifier, the location data and the time data associated therewith, wherein the wireless communication device is configured to communicate the unique identifier, the location data and the time data associated therewith, and information provided to and received by the user interface, via a short range communication protocol thereof and/or via a longer range communication protocol thereof;
   a plurality of portable relay devices configured for being deployed at a site, each said portable relay device having a wireless communication device configured to communicate with the wireless communication devices of said plurality of sets of monitoring devices to relay the unique identifier, the location data and the time data associated therewith, and information provided to and/or received by the user interface, to one or more monitoring stations either directly or via one or more of the plurality of portable relay devices;
      wherein records describing the site and/or communication facilities at the site are received prior to arrival at the site and deployment of the portable relay devices at specific locations at the site is planned based upon the received site records, wherein the portable relay devices are configured based upon the deployment plan including defining for each portable relay device the specific location at which that portable relay device is to be deployed, and wherein each portable relay device is deployed at the specific location at the site defined therefor in accordance with the deployment plan,
      whereby each portable relay device has a specific location defined therein and is deployed substantially at that specific defined location so that location at the site can be defined with respect to each deployed portable relay device without reference to an external locating signal; and
   at least one monitoring station including a communication device configured to communicate directly with the plurality of electronic devices and/or indirectly therewith via the wireless communication devices of said plurality of portable relay devices to receive the unique identifier, the location data and the time data associated therewith, and the information provided to and/or received by the user interface, the at least one monitoring station further including a database for storing the received the unique identifier, the location data and the time data associated therewith, and information provided to and/or received by the user interface,
   the at least one monitoring station further including a processor configured to compare data stored in the data base with one or more predetermined criteria and when one or more of the predetermined criteria is exceeded, to generate an indication thereof and to communicate the indication to the electronic device to which such indication relates, and when there is one or more additional monitoring stations, then to each additional monitoring station.

2. The personnel tracking and monitoring system of claim 1 wherein each set of monitoring devices further includes either:
   an imaging device configured to provide image data and including a wireless transmitter for communicating the image data to the wireless communication device of said electronic device via a first short range communication protocol thereof; or
   a biologic monitor device configured to provide biologic data of a personnel when carried by that personnel and including a wireless transmitter for communicating the biologic data to the wireless communication device of said electronic device via the first or a second short range communication protocol thereof;
   and wherein:
   image data from the imaging device is stored in the data base when the imaging device is included and biologic data from the biologic monitor device is stored in the data base when the biologic monitor device is included, and
   the processor of the at least one monitoring station is configured to compare image data stored in the data base when the imaging device is included and to compare biologic data stored in the data base when the biologic monitor device is included with the one or more predetermined criteria and when the one or more of the predetermined criteria is exceeded, to generate an indication thereof.

3. The system of claim 2 wherein:
   said imaging device includes a still imager or a video imager or both; or
   said biologic monitor senses calories expended, steps taken, stair steps climbed, stair steps descended, time, distance, body temperature, heart rate, respiration, or any combination thereof; or
   said imaging device includes a still imager or a video imager or both, and said biologic monitor senses calories expended, steps taken, stair steps climbed, stair steps descended, time, distance, body temperature, heart rate, respiration, or any combination thereof.

4. The system of claim 1 wherein said locating device includes:
   a global positioning system receiver; or
   a global positioning system receiver including wide area augmentation.

5. The system of claim 4 further comprising at least one accelerometer and/or gyroscopic device and/or a received signal strength indication device configured to provide motion data and to provide location data relative to a location determined by said global positioning system receiver and/or by one or more of the portable relay devices, whereby the location data relative to a location determined by said global positioning system receiver and/or by one or more of the portable relay devices is provided when GPS signal to said global positioning system receiver is lost.

6. The system of claim 1 wherein said electronic device includes a motion sensor configured to provide motion data that is representative of whether a person wearing said electronic device is animated or is substantially motionless, and wherein a notification is generated when the motion data represents that the person wearing said electronic device is substantially motionless for more than a predetermined period of time.

7. The system of claim 6 wherein the notification is:
generated by the processor of said electronic device and is transmitted by the wireless communication device of said electronic device when the motion data represents that the person wearing said electronic device is substantially motionless for more than the predetermined period of time; or
generated by the processor of said monitoring station and is transmitted by the communication device of said monitoring station when the motion data exceeds the predetermined criteria representing being substantially motionless for more than the predetermined period of time.

8. The system of claim 6 wherein said motion sensor includes at least one accelerometer or an inertial device or both.

9. The system of claim 1 wherein said electronic device further comprises one or more sensors that monitor health-indicating characteristics of personnel, ambient conditions, hazardous substances, hazardous conditions, and/or the environment, and wherein said one or more sensors include sensors of environmental conditions, temperature, pressure, position, acceleration, impact, distance, gyroscopic and/or inertial information, magnetic field, electrical continuity, altitude, a physical parameter, moisture, humidity, chemicals, gases, medical parameters, biological substances and/or agents, radioactivity, optical, light, infrared, images, still and/or video images, sound, noise, electromagnetic fields, and any combination of any two or more thereof.

10. The system of claim 1 wherein said user interface comprises:
a sound transducer including any one or more of a buzzer, beeper, annunciator, loudspeaker, earphone, an audibly perceptible device, a microphone, a sound pick up device, or any combination thereof; and/or
a visual transducer including any one or more of a light, a flashing light, a light producing different colors, a LED, a LCD display, a visually perceptible device, a display screen, an imaging device to capture still and/or video images, or a combination thereof.

11. The system of claim 1 wherein:
the records describing the site and/or the communication facilities at the site are received whilst en route to the site; or
the records describing the site and/or the communication facilities at the site are received whilst en route to the site and deployment of the portable relay devices is planned based upon the received site records, wherein the portable relay devices are configured based upon the deployment plan and are deployed at the site in accordance with the deployment plan; or
the records describing the site and/or the communication facilities at the site are received whilst en route to the site, deployment of personnel and of the portable relay devices is planned based upon the received site records, the electronic devices, the portable relay devices or both the electronic devices and the portable relay devices are configured based upon the received site records, the deployment plan or both, and personnel and the portable relay devices are deployed in accordance with the deployment plan.

12. The system of claim 1 wherein the specific defined locations include entrances, exits, stairways, elevators, and/or spaces that are at known predetermined locations at the site.

13. A method for tracking and monitoring personnel comprising:
providing a plurality of sets of monitoring devices configured to be carried by personnel, each set of monitoring devices including:
an electronic device having a unique identifier and including a locating device configured to provide location data, a wireless communication device configured for communicating via a plurality of communication protocols, and a user interface configured to provide information to a user in human perceivable form and to receive information from a user wherein the wireless communication device is configured to communicate information provided to and received by the user interface;
associating the unique identifier, the location data and time data;
transmitting the unique identifier, the location data and the time data associated therewith via a first or a second short range communication protocol or via a longer range communication protocol;
deploying a plurality of portable relay devices at a site, each portable relay device having a wireless communication device configured to communicate with the wireless communication devices of the plurality of sets of monitoring devices;
receiving prior to arrival at the site records describing a configuration of the site;
planning deployment of the portable relay devices at specific locations at the site based upon the received site records;
configuring the portable relay devices based upon the deployment plan including defining for each portable relay device the specific location at which that portable relay device is to be deployed; and
deploying the portable relay devices at the specific locations at the site in accordance with the deployment plan,
whereby each portable relay device has a specific location defined therein and is deployed substantially at that specific defined location so that location with respect to each deployed portable relay device can be defined without reference to an external locating signal;
relaying the unique identifier, the location data and the time data associated therewith to one or more monitoring stations either directly or via one or more of the plurality of portable relay devices;
communicating directly or indirectly with the wireless communication devices of the plurality of portable relay devices to receive the unique identifier, the location data and the time data associated therewith relayed thereby,
storing the received unique identifier, the location data and the time data associated therewith in a database;
comparing data stored in the data base with one or more predetermined criteria and when one or more of the predetermined criteria is exceeded,
generating an indication thereof and communicating the indication to each monitoring station, to the electronic device to which such indication relates, or to each monitoring station and to the electronic device to which such indication relates.

14. The method of claim 13 further comprising:
associating the unique identifier, the location data and time data with image data received from an imaging device and with biologic data received from a biologic monitor device; communicating the image data and biologic data and storing the image data and biologic data in the data base; and
comparing the image data and biologic data stored in the data base with one or more predetermined criteria and when one or more of the predetermined criteria is exceeded,
generating an indication of the predetermined criteria being exceeded by the stored image data, by the stored biologic data, or by both, and communicating this indication to each monitoring station, to the electronic device to which such indication relates, or to each monitoring station and to the electronic device to which this indication relates.

15. The method of claim 14 wherein:
the image data includes still images or video images or both; or
the biologic data includes calories expended, steps taken, stair steps climbed, stair steps descended, time, distance, body temperature, heart rate, respiration, or any combination thereof; or
the image data includes still images or video images or both, and the biologic data includes calories expended, steps taken, stair steps climbed, stair steps descended, time, distance, body temperature, heart rate, respiration, or any combination thereof.

16. The method of claim 13 further comprising:
receiving motion data from at least one accelerometer and/or gyroscopic device and/or a received signal strength indication device of the electronic device; and
processing the motion data to provide location data relative to a location determined by the locating device and/or by one or more of the portable relay devices, whereby the location data relative to a location determined by the locating device and/or by one or more of the portable relay devices is provided when external signal to the locating device is lost.

17. The method of claim 13 further comprising:
receiving motion data from a motion sensor of the electronic device; and
processing the motion data to determine whether a person wearing the electronic device is animated or is substantially motionless.

18. The method of claim 17 further including generating a notification when the motion data represents that the person wearing the electronic device is substantially motionless for more than a predetermined period of time.

19. The method of claim 17 further including generating a notification, wherein the generating the notification includes:

generating the notification in the electronic device and transmitting the notification via the wireless communication device of the electronic device when the motion data represents that the person wearing said electronic device is substantially motionless for more than a predetermined period of time; or
generating the notification at a monitoring station and transmitting the notification to another of the one or more monitoring stations when the motion data exceeds a predetermined criteria representing being substantially motionless for more than a predetermined period of time.

20. The method of claim 17 wherein the motion sensor includes at least one accelerometer or an inertial device or both.

21. The method of claim 13 further including monitoring health-indicating characteristics of personnel, ambient conditions, hazardous substances, hazardous conditions, and/or the environment by one or more sensors of the electronic device, wherein the one or more sensors include sensors of environmental conditions, temperature, pressure, position, acceleration, impact, distance, gyroscopic and/or inertial information, magnetic field, electrical continuity, altitude, a physical parameter, moisture, humidity, chemicals, gases, medical parameters, biological substances and/or agents, radioactivity, optical, light, infrared, images, still and/or video images, sound, noise, electromagnetic fields, and any combination of any two or more thereof.

22. The method of claim 13 wherein the user interface:
provides information audibly including via any one or more of a buzzer, beeper, annunciator, loudspeaker, earphone, an audibly perceptible device, a microphone, a sound pick up device, or any combination thereof; or
provides information visually including via any one or more of a light, a flashing light, a light producing different colors, a LED, a LCD display, a visually perceptible device, a display screen, an imaging device to capture still and/or video images, or a combination thereof; or
provides information both audibly and visually.

23. The method of claim 13 wherein said receiving prior to arrival at the site, said planning deployment, and said configuring the portable relay devices further comprise:
receiving whilst en route to the site the records describing the site and/or communication facilities at the site;
planning deployment of the portable relay devices and/or personnel whilst en route to the site based upon the received records describing the site and/or communication facilities; and
configuring the electronic devices, the portable relay devices or both the electronic devices and the portable relay devices whilst en route to the site based upon the deployment plan.

24. The method of claim 13 wherein the specific defined locations include entrances, exits, stairways, elevators, and/or spaces that are at known predetermined locations at the site.

* * * * *